(12) United States Patent  
Ito

(10) Patent No.: US 7,085,783 B1  
(45) Date of Patent: Aug. 1, 2006

(54) ELECTRONIC CATALOG MAINTENANCE SYSTEM FOR ENABLING OUT-OF-STANDARD ELECTRONIC CATALOG CHANGES

(75) Inventor: Satoshi Ito, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 1432 days.

(21) Appl. No.: 09/716,947

(22) Filed: Nov. 22, 2000

(30) Foreign Application Priority Data

Nov. 22, 1999 (JP) ............................... P11-332038

(51) Int. Cl.
*G06F 12/00* (2006.01)

(52) U.S. Cl. ....................................... 707/203; 705/26

(58) Field of Classification Search ................ 707/203, 707/5; 705/26; 703/22
See application file for complete search history.

(56) References Cited

U.S. PATENT DOCUMENTS

| 5,787,444 | A | 7/1998 | Gerken et al. | |
|---|---|---|---|---|
| 5,864,856 | A | 1/1999 | Young | |
| 6,377,937 | B1 * | 4/2002 | Paskowitz | 705/26 |
| 6,606,603 | B1 * | 8/2003 | Joseph et al. | 705/26 |

FOREIGN PATENT DOCUMENTS

JP 2000-222457 8/2000

OTHER PUBLICATIONS

Silicon Integration Iniciative, Inc., Internet, Online, Version 1.9, XP-002213829, pp. 2-22, "Component Information Dictionary Standard, CIDS Tuturial", Oct. 1, 1999.
G. Pierra, et al., Proceedings of the CALS Europe'98 Conference, XP-002213455, pp. 160-176, "Exchange of Component Data: The PLIB (ISO 13584) Model, Standard and Tools" Sep. 16-18, 1998.
E. Sardet, et al., Proc. of the Internet. Symp. on Global Engineering Networking GEN'97, XP-002213807, 24 pages, "Formal Specification, Modelling and Exchange of Classes of Components According to PLib. A Case Study", Apr. 23-24, 1997.
ISO TC184/SC4/WG2 N 376, Two pages, Jun. 5, 1997.

* cited by examiner

*Primary Examiner*—Mohammad Ali
*Assistant Examiner*—Sathyanarayan Pannala
(74) *Attorney, Agent, or Firm*—Oblon, Spivak, McClelland, Maier & Neustadt, P.C.

(57) ABSTRACT

In an electronic catalog maintenance system using the dictionary data given in a form of a tree structure formed by identifiers for uniquely identifying classes classifying products and attributes of the products, the dictionary data are edited by making changes including standard changes defined by a prescribed standard and out-of-standard changes not defined by the prescribed standard, and an identifier change data indicating the status of each change made by the editing and updates of identifiers to be made in the dictionary data is generated. Then, a new identifier of each class or attribute created by an out-of-standard change is issued and an old identifier of each class or attribute deleted by an out-of-standard change is retired according to the identifier change data, while storing the identifier change data in an identifier change database.

18 Claims, 34 Drawing Sheets

FIG. 2

CLASS DATA

| CID | Preferred_Name | BSU | PARENT CLASS CID | ...... | ...... | DATA QUALITY LEVEL |
|---|---|---|---|---|---|---|
| A0 | CLASS A0 | A001 | | | | A |
| B0 | CLASS B0 | A002 | A001 | | | A |
| B1 | CLASS B1 | A003 | A001 | | | A |
| C0 | CLASS C0 | A004 | A002 | | | B |
| C1 | CLASS C1 | A005 | A002 | | | B |
| C2 | CLASS C2 | A006 | A003 | | | C |
| C3 | CLASS C3 | A007 | A003 | | | D |

FIG. 3

ATTRIBUTE DATA

| PID | Preferred_Name | BSU | ...... | ...... | ...... | DATA QUALITY LEVEL |
|---|---|---|---|---|---|---|
| V0 | ATTRIBUTE V0 | P001 | | | | A |
| V1 | ATTRIBUTE V1 | P002 | | | | A |
| V2 | ATTRIBUTE V2 | P003 | | | | A |
| V3 | ATTRIBUTE V3 | P004 | | | | B |
| V4 | ATTRIBUTE V4 | P005 | | | | B |
| V5 | ATTRIBUTE V5 | P006 | | | | B |
| V6 | ATTRIBUTE V6 | P007 | | | | B |

FIG. 4

CLASS-ATTRIBUTE RELATIONSHIP DATA

| PID | CID scope | Visible | Applicable |
|---|---|---|---|
| V0 | A0 | A0, B0, B1, C0, C1, C2, C3 | A0, B0, B1, C0, C1, C2, C3 |
| V1 | B0 | B0, C0, C1 | B0, C0, C1 |
| V2 | C0 | C0 | NULL |
| V3 | C1 | C1 | C1 |
| V4 | B1 | B1, C2, C3 | C3 |
| V5 | C2 | C2 | NULL |
| V6 | C3 | C3 | NULL |

FIG. 5

CLASS BSU CODE CHANGE DATA

| Status | CID | BSU | Refer to | Same as |
|--------|-----|------|----------|---------|
| NEW | C4 | NULL | NULL | C3 |
| OOD | C3 | A007 | C4 | NULL |
| RUP | C2 | A006 | NULL | NULL |

※ VUP : Version UP
RUP : Revision UP
NEW : New BSU
OOD : Out of Dictionary

FIG. 6

ATTRIBUTE BSU CODE CHANGE DATA

| Status | PID | BSU | Refer to | Same as |
|--------|-----|------|----------|---------|
| NEW | V7 | NULL | NULL | V4 |
| NEW | V8 | NULL | NULL | V6 |
| OOD | V6 | P007 | V8 | NULL |
| RUP | V2 | P003 | NULL | NULL |

FIG. 9

DICTIONARY SYSTEM QUALITY DATA

| ID | CONTENT |
|---|---|
| C1 | THERE IS ONE SUB-CLASS |
| V7 | CONTENT IS SAME AS V3 |
| V8 | CONTENT IS SAME AS V4 |
| V9 | CONTENT IS SAME AS V5 |
| CLASS SYSTEM | B |

FIG. 14

| RULE 1 : | IF (CHANGE OF PRODUCT CLASS) AND (CHANGE THAT IS Revision UP AS DESCRIBED IN ISO 13584-42) THEN (Revision UP OF PRODUCT CLASS) |
|---|---|
| RULE 2 : | IF (CHANGE OF PRODUCT CLASS) AND (CHANGE THAT IS Version UP AS DESCRIBED IN ISO 13584-42) THEN (Version UP OF PRODUCT CLASS) |
| RULE 3 : | IF (NEW CREATION OF END PRODUCT CLASS) THEN (New BSU OF OF PRODUCT CLASS) |
| RULE 4 : | IF (MERGE OF PRODUCT CLASS) THEN (New BSU OF PRODUCT CLASS) AND (UNUSED CLASS = PRODUCT CLASS TO BE MERGED) |
| RULE 5 : | IF (MOVE OF PRODUCT CLASS) AND (TOPOLOGY CHANGE) THEN (New BSU OF PRODUCT CLASS) AND (UNUSED CLASS = PRODUCT CLASS BEFORE MOVING) |
| RULE 6 : | IF (DELETE OF INTERMEDIATE PRODUCT CLASS) THEN (New BSU OF PRODUCT CLASS) AND (UNUSED CLASS = PRODUCT CLASS TO BE DELETED) |
| RULE 7 : | IF (INSERT OF INTERMEDIATE PRODUCT CLASS) THEN (New BSU OF PRODUCT CLASS) |
| RULE 8 : | IF (DELETE OF END PRODUCT CLASS) THEN (UNUSED CLASS = PRODUCT CLASS TO BE DELETED) |
| RULE 9 : | IF (CHANGE OF ATTRIBUTE) AND (CHANGE THAT IS Revision UP AS DESCRIBED IN ISO 13584-42) THEN (Revision UP OF ATTRIBUTE) |
| RULE 10 : | IF (CHANGE OF ATTRIBUTE) AND (CHANGE THAT IS Version UP AS DESCRIBED IN ISO 13584-42) THEN (Version UP OF ATTRIBUTE) |
| RULE 11 : | IF (NEW CREATION OF ATTRIBUTE) THEN (New BSU OF ATTRIBUTE) |
| RULE 12 : | IF (DELETE OF ATTRIBUTE) THEN (UNUSED ATTRIBUTE = ATTRIBUTE TO BE DELETED) |
| RULE 13 : | IF (CHANGE OF Name Scope OF ATTRIBUTE) THEN (New BSU OF ATTRIBUTE) AND (UNUSED ATTRIBUTE = ATTRIBUTE BEFORE CHANGE) |

FIG. 17
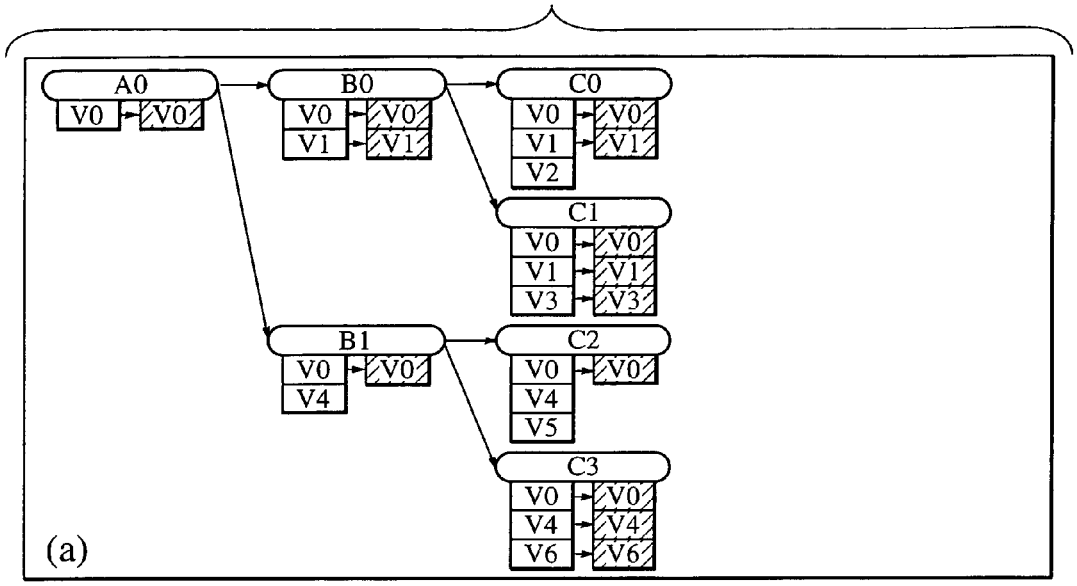
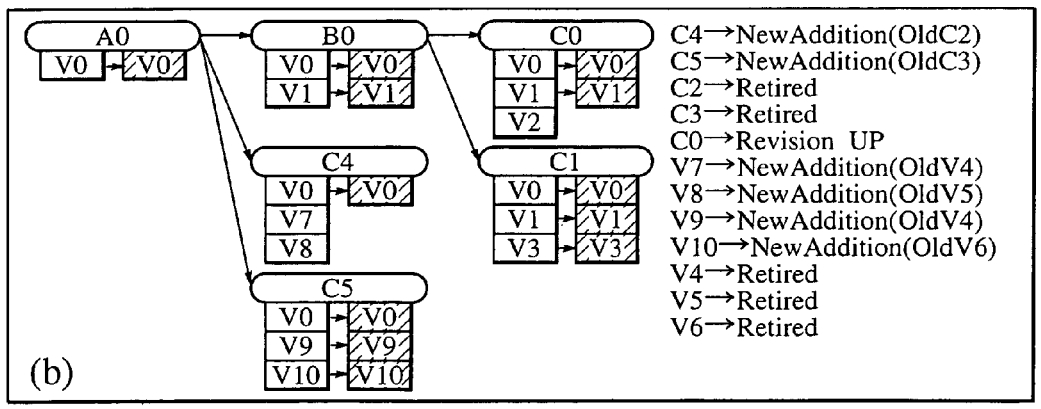
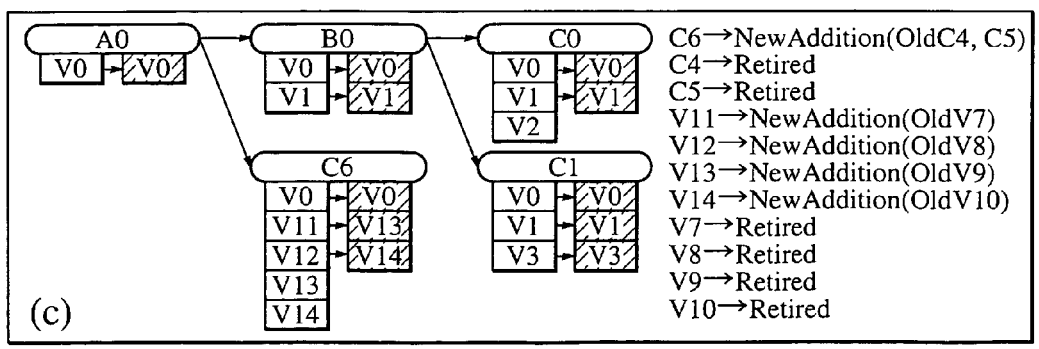

FIG. 18

CLASS BSU CODE CHANGE DATA (a)

| Status | CID | BSU | Refer to | Same as |
|---|---|---|---|---|
| NEW | C4 | NULL | NULL | C2 |
| NEW | C5 | NULL | NULL | C3 |
| OOD | C2 | A007 | C4 | NULL |
| OOD | C3 | A008 | C5 | NULL |
| RUP | C0 | A006 | NULL | NULL |
| NEW | C6 | NULL | NULL | (C4, C5) |
| OOD | C4 | NULL | C6 | NULL |
| OOD | C5 | NULL | C6 | NULL |

(b)

| Status | CID | BSU | Refer to | Same as |
|---|---|---|---|---|
| NEW | C4 | NULL | NULL | C2 |
| NEW | C5 | NULL | NULL | C3 |
| OOD | C2 | A007 | C4 | NULL |
| OOD | C3 | A008 | C6 | NULL |
| RUP | C0 | A006 | NULL | NULL |
| NEW | C6 | NULL | NULL | (C4, C3) |
| OOD | C4 | NULL | C6 | NULL |
| OOD | C5 | NULL | C6 | NULL |

(c)

| Status | CID | BSU | Refer to | Same as |
|---|---|---|---|---|
| NEW | C4 | NULL | NULL | C2 |
| OOD | C2 | A007 | C4 | NULL |
| OOD | C3 | A008 | C6 | NULL |
| RUP | C0 | A006 | NULL | NULL |
| NEW | C6 | NULL | NULL | (C4, C3) |
| OOD | C4 | NULL | C6 | NULL |

(d)

| Status | CID | BSU | Refer to | Same as |
|---|---|---|---|---|
| NEW | C4 | NULL | NULL | C2 |
| OOD | C2 | A007 | C6 | NULL |
| OOD | C3 | A008 | C6 | NULL |
| RUP | C0 | A006 | NULL | NULL |
| NEW | C6 | NULL | NULL | (C2, C3) |
| OOD | C4 | NULL | C6 | NULL |

(e)

| Status | CID | BSU | Refer to | Same as |
|---|---|---|---|---|
| OOD | C2 | A007 | C6 | NULL |
| OOD | C3 | A008 | C6 | NULL |
| RUP | C0 | A006 | NULL | NULL |
| NEW | C6 | NULL | NULL | (C2, C3) |

FIG. 19

ATTRIBUTE BSU CODE CHANGE DATA (a)

| Status | PID | BSU | Refer to | Same as |
|---|---|---|---|---|
| NEW | V7 | NULL | NULL | V4 |
| NEW | V8 | NULL | NULL | V5 |
| NEW | V9 | NULL | NULL | V4 |
| NEW | V10 | NULL | NULL | V6 |
| OOD | V4 | P004 | (V7, V9) | NULL |
| OOD | V5 | P005 | V8 | NULL |
| OOD | V6 | P006 | V10 | NULL |
| NEW | V11 | NULL | NULL | V4 |
| NEW | V12 | NULL | NULL | V5 |
| NEW | V13 | NULL | NULL | V4 |
| NEW | V14 | NULL | NULL | V6 |
| OOD | V7 | NULL | V11 | NULL |
| OOD | V8 | NULL | V12 | NULL |
| OOD | V9 | NULL | V13 | NULL |
| OOD | V10 | NULL | V14 | NULL |

(b)

| Status | PID | BSU | Refer to | Same as |
|---|---|---|---|---|
| NEW | V7 | NULL | NULL | V4 |
| NEW | V8 | NULL | NULL | V5 |
| NEW | V9 | NULL | NULL | V4 |
| NEW | V10 | NULL | NULL | V6 |
| OOD | V4 | P004 | (V7, V9) | NULL |
| OOD | V5 | P005 | V8 | NULL |
| OOD | V6 | P006 | V14 | NULL |
| NEW | V11 | NULL | NULL | V7 |
| NEW | V12 | NULL | NULL | V8 |
| NEW | V13 | NULL | NULL | V9 |
| NEW | V14 | NULL | NULL | V6 |
| OOD | V7 | NULL | V11 | NULL |
| OOD | V8 | NULL | V12 | NULL |
| OOD | V9 | NULL | V13 | NULL |
| OOD | V10 | NULL | V14 | NULL |

(c)

| Status | PID | BSU | Refer to | Same as |
|---|---|---|---|---|
| NEW | V7 | NULL | NULL | V4 |
| NEW | V8 | NULL | NULL | V5 |
| NEW | V9 | NULL | NULL | V4 |
| OOD | V4 | P004 | (V7, V9) | NULL |
| OOD | V5 | P005 | V8 | NULL |
| OOD | V6 | P006 | V14 | NULL |
| NEW | V11 | NULL | NULL | V7 |
| NEW | V12 | NULL | NULL | V8 |
| NEW | V13 | NULL | NULL | V9 |
| NEW | V14 | NULL | NULL | V6 |
| OOD | V7 | NULL | V11 | NULL |
| OOD | V8 | NULL | V12 | NULL |
| OOD | V9 | NULL | V13 | NULL |

(d)

| Status | PID | BSU | Refer to | Same as |
|---|---|---|---|---|
| NEW | V7 | NULL | NULL | V4 |
| NEW | V8 | NULL | NULL | V5 |
| NEW | V9 | NULL | NULL | V4 |
| OOD | V4 | P004 | (V7, V13) | NULL |
| OOD | V5 | P005 | V8 | NULL |
| OOD | V6 | P006 | V14 | NULL |
| NEW | V11 | NULL | NULL | V7 |
| NEW | V12 | NULL | NULL | V8 |
| NEW | V13 | NULL | NULL | V4 |
| NEW | V14 | NULL | NULL | V6 |
| OOD | V7 | NULL | V11 | NULL |
| OOD | V8 | NULL | V12 | NULL |
| OOD | V9 | NULL | V13 | NULL |

(e)

| Status | PID | BSU | Refer to | Same as |
|---|---|---|---|---|
| NEW | V7 | NULL | NULL | V4 |
| NEW | V8 | NULL | NULL | V5 |
| OOD | V4 | P004 | (V7, V13) | NULL |
| OOD | V5 | P005 | V8 | NULL |
| OOD | V6 | P006 | V14 | NULL |
| NEW | V11 | NULL | NULL | V7 |
| NEW | V12 | NULL | NULL | V8 |
| NEW | V13 | NULL | NULL | V4 |
| NEW | V14 | NULL | NULL | V6 |
| OOD | V7 | NULL | V11 | NULL |
| OOD | V8 | NULL | V12 | NULL |

(f)

| Status | PID | BSU | Refer to | Same as |
|---|---|---|---|---|
| NEW | V7 | NULL | NULL | V4 |
| NEW | V8 | NULL | NULL | V5 |
| OOD | V4 | P004 | (V7, V13) | NULL |
| OOD | V5 | P005 | V12 | NULL |
| OOD | V6 | P006 | V14 | NULL |
| NEW | V11 | NULL | NULL | V7 |
| NEW | V12 | NULL | NULL | V5 |
| NEW | V13 | NULL | NULL | V4 |
| NEW | V14 | NULL | NULL | V6 |
| OOD | V7 | NULL | V11 | NULL |
| OOD | V8 | NULL | V12 | NULL |

(g)

| Status | PID | BSU | Refer to | Same as |
|---|---|---|---|---|
| NEW | V7 | NULL | NULL | V4 |
| OOD | V4 | P004 | (V7, V13) | NULL |
| OOD | V5 | P005 | V12 | NULL |
| OOD | V6 | P006 | V14 | NULL |
| NEW | V11 | NULL | NULL | V7 |
| NEW | V12 | NULL | NULL | V5 |
| NEW | V13 | NULL | NULL | V4 |
| NEW | V14 | NULL | NULL | V6 |
| OOD | V7 | NULL | V11 | NULL |

(h)

| Status | PID | BSU | Refer to | Same as |
|---|---|---|---|---|
| NEW | V7 | NULL | NULL | V4 |
| OOD | V4 | P004 | (V7, V13) | NULL |
| OOD | V5 | P005 | V12 | NULL |
| OOD | V6 | P006 | V14 | NULL |
| NEW | V11 | NULL | NULL | V4 |
| NEW | V12 | NULL | NULL | V5 |
| NEW | V13 | NULL | NULL | V4 |
| NEW | V14 | NULL | NULL | V6 |
| OOD | V7 | NULL | V11 | NULL |

(i)

| Status | PID | BSU | Refer to | Same as |
|---|---|---|---|---|
| OOD | V4 | P004 | (V11, V13) | NULL |
| OOD | V5 | P005 | V12 | NULL |
| OOD | V6 | P006 | V14 | NULL |
| NEW | V11 | NULL | NULL | V4 |
| NEW | V12 | NULL | NULL | V5 |
| NEW | V13 | NULL | NULL | V4 |
| NEW | V14 | NULL | NULL | V6 |

FIG. 21A

| RULE 1: | IF (E=PRODUCT CLASS) AND (INDIVIDUAL CHECK)<br>THEN(E.QUALITY LEVEL=EVALUATION FUNCTION F1 (E)) |
|---|---|
| RULE 2: | IF (E=ATTRIBUTE CLASS) AND (INDIVIDUAL CHECK)<br>THEN(E.QUALITY LEVEL=EVALUATION FUNCTION F2(E)) |
| RULE 3: | IF (E=PRODUCT CLASS) AND (SYSTEM CHECK)<br>THEN(SYSTEM QUALITY LEVEL L1=EVALUATION FUNCTION F3 (E)) |
| RULE 4: | IF (E=ATTRIBUTE CLASS) AND (SYSTEM CHECK)<br>THEN(SYSTEM QUALITY LEVEL L1=EVALUATION FUNCTION F4(E)) |
| RULE 5: | IF (E=DICTIONARY)<br>THEN(SYSTEM QUALITY LEVEL L1=EVALUATION FUNCTION F5(E)) |

| EVALUATION<br>FUNCTION 1: | IF((Y=# OF ATTRIBUTES DESCRIBED IN X/ # OF ATTRIBUTES OF X)>0.9)THEN QUALITY LEVEL="A" |
|---|---|
| | ELSE IF $(0.9 \geq Y > 0.6)$ THEN QUALITY LEVEL="B" |
| | ELSE IF $(0.6 \geq Y > 0.4)$ THEN QUALITY LEVEL="C" |
| | ELSE IF $(0.4 \geq Y)$ THEN QUALITY LEVEL="D" |
| EVALUATION<br>FUNCTION 2: | IF((Y=# OF ATTRIBUTES DESCRIBED IN X/ # OF ATTRIBUTES OF X)>0.95)THEN QUALITY LEVEL="A" |
| | ELSE IF $(0.95 \geq Y > 0.8)$ THEN QUALITY LEVEL="B" |
| | ELSE IF $(0.8 \geq Y > 0.6)$ THEN QUALITY LEVEL="C" |
| | ELSE IF $(0.6 \geq Y)$ THEN QUALITY LEVEL="D" |
| EVALUATION<br>FUNCTION 3: | IF (X!= END CLASS) AND (# OF SUB-CLASSES OF X=1) |
| | THEN L1=L1+1, Return ("X.CID", "THERE IS ONE SUB_CLASS") |
| EVALUATION<br>FUNCTION 4: | IF (X.Same-as!=NULL) AND<br>(NOT (Z.CID=X.Same_as) AND (Z.Status="OOD")) |
| | THEN L1=L1+1, Return ("X.CID", "SAME AS X.Same_as")) |
| EVALUATION<br>FUNCTION 5: | IF (L1<5) THEN QUALITY LEVEL = "A" |
| | ELSE IF $(10 \geq L1 > 5)$ THEN QUALITY LEVEL="B" |
| | ELSE IF $(50 \geq L1 > 10)$ THEN QUALITY LEVEL="C" |
| | ELSE IF $(50 > L1)$ THEN QUALITY LEVEL="D" |

FIG. 21B

| RULE 1: | IF ISSUING OF CLASS BSU<br>THEN BSU CODE ="A"+MAX OF CURRENT<br>CLASS BSU ISSUED No.+1 |
|---|---|
| RULE 2: | IF ISSUING OF ATTRIBUTE BSU<br>THEN BSU CODE = "P"+MAX OF CURRENT<br>ATTRIBUTE BSU ISSUED No.+1 |

FIG. 28A PRIOR ART

Regarding Rev/Ver of Property

| Concept model | i Data model | Add | Change | Delete |
|---|---|---|---|---|
| Code | Property_BSU.code | – | X | X |
| Definition Class | Property_BSU.name_scope | X | X | X |
| Data type | Property_DET.domain | – | V(※8) | X |
| Preferred Name | item_name.name | – | R | X |
| Short Name | item_name.Short_name | – | R | X |
| Preferred Letter Symbol | Property_DET.preferred_symbol | R | R | X |
| Synonymous Letter Symbol | Property_DET.synonymous_symbols | R | R | R |
| Synonymous Name | item_name.Synonymous_names | R | R | R |
| Property Type Classification | Property_DET.DET_classification | – | R(※9) | X |
| Definition | Property_DET.definition | – | R/V(※10) | X |
| Source Document of definition | identified_document.document_identifier | R(※11) | R(※11) | R |
| Note | Property_DET.note | R(※11) | R(※11) | R |
| Remark | Property_DET.remark | R(※11) | R(※11) | R |
| Unit | int/real_measure_type.unit.structured_representation | – | X | X |
| Condition | Property_DET.depends_on | X | X/R(※12) | X |
| Formula | Property_DET.formula | R(※11) | R(※11) | R(※11) |
| Format | Property_DET.domain.simple_type.value_format | – | V | X |
| Date of Original Definition | dates.date_of_original_definition | – | V | X |
| Date of current version | dates.date_of_current_version | – | V | X |
| Date of current revision | dates.date_of_current_revision | – | R/V | X |
| Version number | Property_BSU.version | – | V | X |
| Revision number | Property_DET.revision | – | R | X |

※8 Change of Data_type itself not allowed. Possible are:
  1. Addition of option of enumeration type data
  2. Change of Version of class constituting attribute range(ex:is_part_of relationship)
  3. Change of Version of Data_type BSU ※9 Only in case of Rev change of ISO31 or ISO13584.

※10 Change of definition that affects Property is not allowed. But processing for evaluating value of this Property may be Changed. Ver change in such case, or Rev change otherwise.

※11 Change of definition that affects Property is not allowed.

※12 Change of Condition_DET is not allowed. Version change of Condition_DET will propagate to Depend_P_DET.

FIG. 28B PRIOR ART

Regarding Rev/Ver of Class

| Concept model | i Data model | Add | Change | Delete |
|---|---|---|---|---|
| Code | Class_BSU.code | – | X | X |
| Super Class | Class.its_superclass | V(※15) | V(※12) | V(※12) |
| Preferred Name | item_name.name | – | R | X |
| Short Name | item_name.Short_name | V | V(※16) | X |
| Visible Type | Class_BSU.added_visible_data_type | V | V(※16) | X |
| Applicable Type | Class.defined_types | V | V(※16) | X |
| Sub-class selection Property | class.sub_class_properties | R | R | R |
| Synonymous Name | item_name.Synonymous_names | V | V(※16) | X |
| Visible Property | Class_BSU.added_visible_property | V | V(※16) | X |
| Applicable Property | Described_by | – | V(※16) | X |
| Class Value assignment | Class.class_constant_values | – | R/V(※17) | R |
| Definition | Property_DET.definition | R | R | R |
| Source Document of definition | identified_document.document_identifier | R | R | R |
| Note | Property_DET.note | R | R | R |
| Remark | Property_DET.remark | – | R | R |
| Simplified Drawing | Class.simplified_drawing | – | X | X |
| Date of Original Definition | dates.date_of_original_definition | – | V | X |
| Date of current version | dates.date_of_current_version | – | R/V | X |
| Date of current revision | dates.date_of_current_revision | – | V | X |
| Version number | Property_BSU.version | – | R | X |
| Revision number | Property_BSU.revision | – | R | X |

※13 Value can only be added.
※14 Change of arbitrary element of Dependent_P_DET Set.
※15 Property/Data_type of inherited Visible/Applicable Should not be deleted by change of Super Class. This occurs when (1) new Version is created by Sub-Class, or(2) intermediate class is inserted.
※16 Change is only addition of new Item or change of Version of Item to be referred.
※17 Change of definition that affects Property is not allowed.

Propagation of change of Class V/R
· Version change of parent class→Version charge of all children classes (grand children classes)
· Version change of Table or contents that refer to class→Version change of that class

FIG. 29
PRIOR ART

CREATION OF END CLASS

| AAA | | | |
|---|---|---|---|
| ⊢ | BBB | | |
| | ⊢ | CCC | |
| | ⊢ | DDD | |
| | | ⊢ | EEE |

Newly Create

⇩

| AAA | | | |
|---|---|---|---|
| ⊢ | BBB | | |
| | ⊢ | CCC | |
| | ⊢ | DDD | |
| | | ⊢ | EEE |
| | | | FFF |

| Class Name : FFF | | |
|---|---|---|
| Visible | Applicable | Inherit |
| YYY × | YYY | DDD |
| ZZZ → | | DDD |

Class HHH → NewBSU

FIG. 30
PRIOR ART

DELETION OF END CLASS

| AAA | | | |
|---|---|---|---|
| ⊢ | BBB | | |
| | ⊢ | CCC | |
| | ⊢ | DDD | |
| | | ⊢ | EEE |
| | | ⊢ | HHH |

| Class Name : HHH | | |
|---|---|---|
| Visible | Applicable | Inherit |
| YYY × | YYY | DDD |
| ZZZ → | | DDD |
| SSS → | | |

⇩

| AAA | | | |
|---|---|---|---|
| ⊢ | BBB | | |
| | ⊢ | CCC | |
| | ⊢ | DDD | |
| | | ⊢ | EEE |
| | | | HHH |

Delete

⇩

| AAA | | | |
|---|---|---|---|
| ⊢ | BBB | | |
| | ⊢ | CCC | |
| | ⊢ | DDD | |
| | | ⊢ | EEE |

Old HHH → Retired
Old SSS → Retired

FIG. 35
PRIOR ART
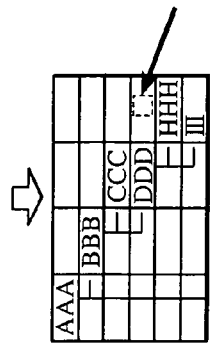
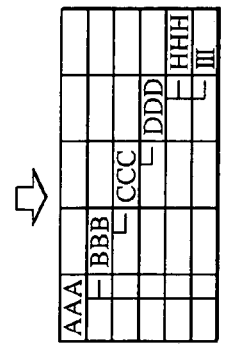

ELECTRONIC CATALOG MAINTENANCE SYSTEM FOR ENABLING OUT-OF-STANDARD ELECTRONIC CATALOG CHANGES

BACKGROUND OF THE INVENTION

1. Field of the Invention

The present invention relates to an electronic catalog maintenance system for maintaining an electronic catalog formed according to a prescribed standard such as ISO13584.

2. Description of the Background Art

ISO13584 (Parts Library) is the conventionally known international standard for implementing the electronic catalog system for electronically providing product information on the Internet. In this ISO13584, the electronic catalog is formed by dictionary data and contents (catalog data), which are given in a unified data structure in order to realize sharing and reuse of the product information.

In the dictionary data defined by ISO13584, the product classification is expressed hierarchically as in an example shown in FIG. 27, by relating "product classes" A0, B0, B1 and C0–C3 by a single tree structure. Each of the "product classes" A0, B0, B1, C0–C3 has "attribute items" V0–V6, and the "attribute items" of one "product class" (such as V0 and V1 belonging to B0, for example) are inherited to the lower "product classes" (C0 and C1).

Also, in ISO13584, a unique ID (identifier) called "BSU (Basic Semantic Unit) code" is to be assigned to each one of the "product classes" and the "attribute items" in order to identify it uniquely. Note that the "attribute items" includes "Visible" type attribute items which can only be referred and "Applicable" type attribute items for which actual values can be entered. The "Applicable" type attribute items are to be selected from "Visible" type attribute items that can be referred (V0 of C2, for example).

While ISO13584 provides a framework for the electronic catalog, the international standardization of actual dictionary data is also in progress, and IEC61360 is currently striving for the standardization of the upper hierarchy part of the dictionary data in the field of electric and electronic products, that is, the general part regarding the "product classes" and the "attribute items". As a result, a product catalog producer of each company can creates that company's own contents by determining the original detailed "product classes" and "attribute items" as a lower level development from IEC61360.

A user of the electronic catalog can retrieve a desired product from the contents created in this way by tracing the classification hierarchy of the "product classes" and narrowing down products that can meet his/her needs by referring to attribute values. In recent years, several systems in compliance with ISO13584 have been developed in this trend.

In ISO13584 described above, a basic idea of the maintenance regarding a dictionary system formed according to the definition is described, and in particular, a mechanism based on Version/Revision updates is described for management of the dictionary.

FIGS. 28A and 28B summarize that basic idea. In FIG. 28A, a way of handling each type is described for addition, change, and deletion of associated information of the attribute item (property). Also, in FIG. 28B, a way of handling each type is described for addition, change, and deletion of associated information of the product class (which will be referred to hereafter as "class").

However, according to the agreement shown in FIGS. 28A and 28B, changes of the dictionary are very limited, and in particular, changes required in the following cases cannot be handled.

Case 1) Deletion of Visible/Applicable Property
Case 2) Change of Visible/Applicable Property
Case 3) Change which deletes a Property to be inherited, among changes of Super Class
Case 4) Change of Name scope of Visible Property Note however that, in Case 2), the "Version UP of Property" event is excluded, and addition of Visible/Applicable Property can be handled by Version up.

Note also that, in Case 3), the "Version UP of Super Class" event is excluded, and change which does not delete a Property to be inherited such as insertion of an intermediate class can be handled by Version up, while change of Preferred Name can be handled by Revision up.

Now, it is expected that these Case 1) to Case 4) will occur frequently in practice as in the case of changing the class hierarchy structure. For example, they are expected to occur in the case of newly creating a class (FFF) at an end (EEE) of the tree structure as shown in FIG. 29, the case of deleting an end class (HHH) as shown in FIG. 30, the case of merging a plurality of product classes (EEE and HHH) to one product class (KKK) as shown in FIG. 31, the case of moving the product class (HHH or DDD) as shown in FIGS. 32, 33, 34 and 35, and the case of creating or deleting an intermediate class (HHH) as shown in FIGS. 36 and 37.

Consequently, it is practically very important to enable handling of such cases as Case 1) to Case 4) by going beyond the framework of ISO13584. However, the following problems are encountered in realizing this.

First, the BSU code that is once issued and disclosed cannot be deleted and must be permanently managed even when it becomes unused as it is taken out from the dictionary system, because there is a possibility of referencing from the legacy system, so that there is a need to be compatible with the legacy system.

Second, one class or attribute can be regarded as a number of different classes or attributes when the hierarchy structure is changed, even if the definition and the content of that class or attribute as a single entity remain unchanged. This will cause a large number of the new issuance of the BSU code and the releasing of the BSU code so that the management of codes becomes very difficult. For this reason, there is a need to provide a function for comprehending the new issuance of the BSU code.

SUMMARY OF THE INVENTION

It is therefore an object of the present invention to provide an electronic catalog maintenance system capable of improving usefulness and generality of the electronic catalog by ensuring the freedom of changes of the electronic catalog, while making the changed electronic catalog data utilizable even in the conventional systems.

According to one aspect of the present invention there is provided an electronic catalog maintenance system, comprising: a dictionary database configured to store dictionary data of an electronic catalog, the dictionary data being given in a form of a tree structure formed by identifiers for uniquely identifying classes classifying products and attributes of the products; an editing unit configured to edit the dictionary data stored by the dictionary database by making changes including standard changes defined by a prescribed standard and out-of-standard changes not defined by the prescribed standard; a change status detection unit configured to detect a status of each change made by the editing unit, and to generate an identifier change data indicating the status of each change made by the editing unit and updates of identifiers to be made in the distrionary data; an identifier update unit configured to issue a new identifier of each class or attribute created by an out-of-standard change made by the editing unit, and to retire an old identifier of each class or attribute deleted by an out-of-standard change made by the editing unit, according to the identifier change data generated by the change status detection unit; and an identifier change database configured to store the identifier change data generated by the change status detection unit.

According to another aspect of the present invention there is provided an electronic catalog maintenance method, comprising the steps of: (a) storing dictionary data of an electronic catalog in a dictionary database, the dictionary data being given in a form of a tree structure formed by identifiers for uniquely identifying classes classifying products and attributes of the products; (b) editing the dictionary data stored by the dictionary database by making changes including standard changes defined by a prescribed standard and out-of-standard changes not defined by the prescribed standard; (c) detecting a status of each change made by the step (b), and generating an identifier change data indicating the status of each change made by the step (b) and updates of identifiers to be made in the dictionary data; (d) issuing a new identifier of each class or attribute created by an out-of-standard change made by the step (b), and releasing an old identifier of each class or attribute deleted by an out-of-standard change made by the step (b), according to the identifier change data generated at the step (c); and (e) storing the identifier change data generated by the step (c) in an identifier change database.

According to another aspect of the present invention there is provided a computer usable medium having computer readable program codes embodied therein for causing a computer to function as an electronic catalog maintenance system, the computer readable program codes include: a first computer readable program code for causing said computer to store dictionary data of an electronic catalog in a dictionary database, the dictionary data being given in a form of a tree structure formed by identifiers for uniquely identifying classes classifying products and attributes of the products; a second computer readable program code for causing said computer to edit the dictionary data stored by the dictionary database by making changes including standard changes defined by a prescribed standard and out-of-standard changes not defined by the prescribed standard; a third computer readable program code for causing said computer to detect a status of each change made by the editing unit, and to generate an identifier change data indicating the status of each change made by the editing unit and updates of identifiers to be made in the dictionary data; a fourth computer readable program code for causing said computer to issue a new identifier of each class or attribute created by an out-of-standard change made by the editing unit, and to retire an old identifier of each class or attribute deleted by an out-of-standard change made by the editing unit, according to the identifier change data generated by the third computer readable program code; and a fifth computer readable program code for causing said computer to store the identifier change data generated by the third computer readable program code in an identifier change database.

Other features and advantages of the present invention will become apparent from the following description taken in conjunction with the accompanying drawings.

BRIEF DESCRIPTION OF THE DRAWINGS

FIG. 2 is a diagram showing an example of class data in electronic catalog dictionary data used by the electronic catalog maintenance system of FIG. 1.

FIG. 3 is a diagram showing an example of attribute data in electronic catalog dictionary data used by the electronic catalog maintenance system of FIG. 1.

FIG. 4 is a diagram showing an example of class-attribute relationship data in electronic catalog dictionary data used by the electronic catalog maintenance system of FIG. 1.

FIG. 5 is a diagram showing an example of class BSU code change data in BSU code change data used by the electronic catalog maintenance system of FIG. 1.

FIG. 6 is a diagram showing an example of attribute BSU code change data in BSU code change data used by the electronic catalog maintenance system of FIG. 1.

FIG. 9 is a diagram showing an example of dictionary system quality data used by the electronic catalog maintenance system of FIG. 1.

FIG. 14 is a diagram showing an example of change type discrimination rules used by the electronic catalog maintenance system of FIG. 1.

FIG. 17 is a diagram showing an exemplary manner of changing BSU codes due to dictionary data editing at the step S12 of FIG. 10.

FIG. 18 is a diagram showing class BSU code change data and its summary generated as a result of changes shown in FIG. 17.

FIG. 19 is a diagram showing attribute BSU code change data and its summary generated as a result of changes shown in FIG. 17.

FIG. 21A is a diagram showing an example of quality check rules used by the electronic catalog maintenance system of FIG. 1.

FIG. 21B is a diagram showing an example of BSU code issuance rules used by the electronic catalog maintenance system of FIG. 1.

FIG. 28A is a diagram showing Version/Revision update rules for property (attribute) as defined by ISO13584.

FIG. 28B is a diagram showing Version/Revision update rules for class (attribute) as defined by ISO13584.

FIG. 29 is a diagram showing an exemplary BSU code change due to an electronic catalog change for creation of end class.

FIG. 30 is a diagram showing an exemplary BSU code change due to an electronic catalog change for deletion of end class.

FIG. 35 is a diagram showing an exemplary BSU code change due to an electronic catalog change for moving of a class.

DETAILED DESCRIPTION OF THE PREFERRED EMBODIMENTS

Referring now to FIG. 1 to FIG. 26, one embodiment of the electronic catalog maintenance system according to the present invention will be described in detail.

(Overall Configuration of the Electronic Catalog Maintenance System)

Figure 1:
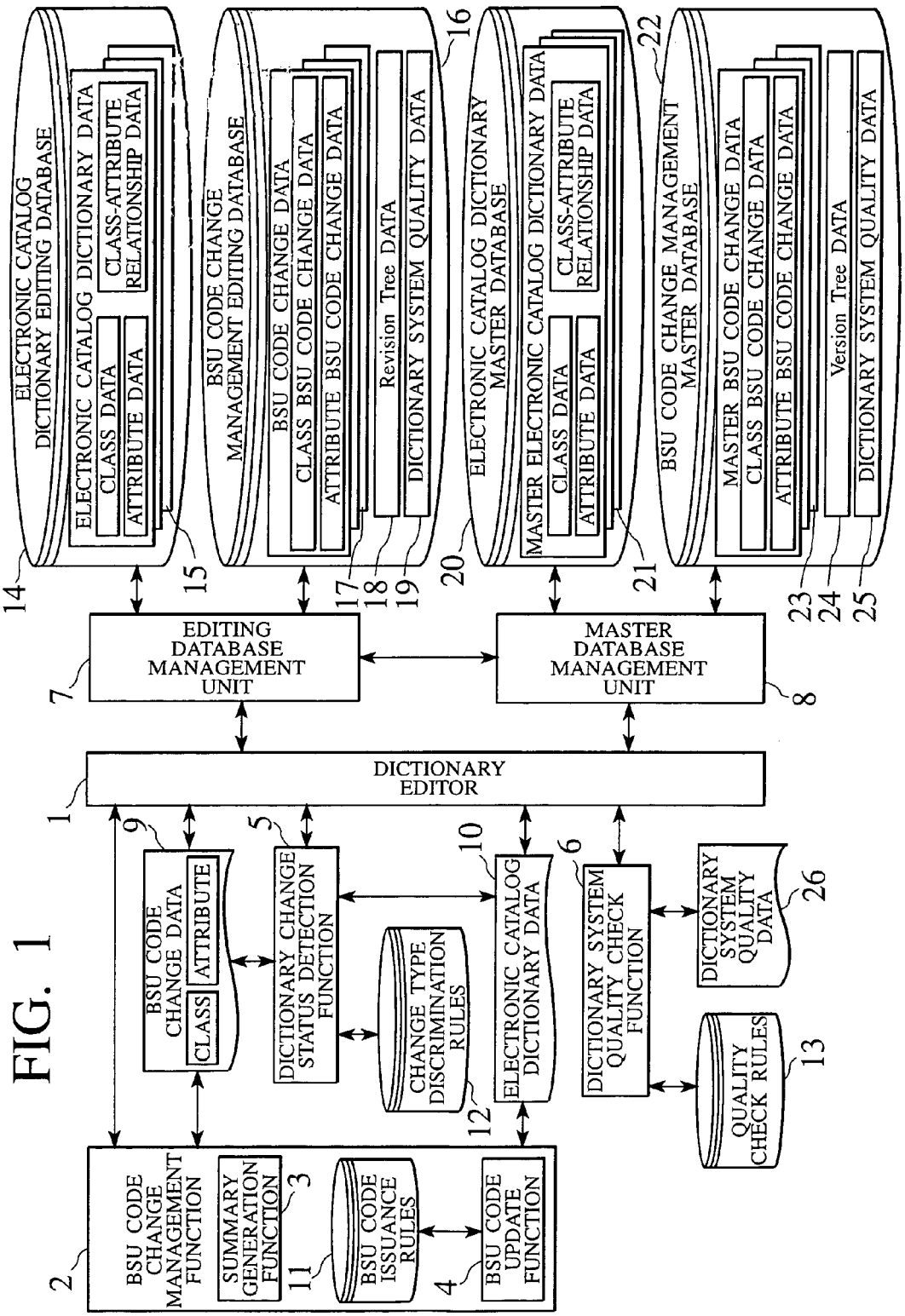
FIG. 1 is a block diagram showing an overall configuration of an electronic catalog maintenance system according to one embodiment of the present invention.

FIG. 1 shows a schematic configuration of the electronic catalog maintenance system according to this embodiment.

As shown in FIG. 1, the electronic catalog maintenance system of this embodiment comprises a dictionary editor 1, a BSU code change management function 2, a dictionary change status detection function 5, a dictionary system quality check function 6, an editing database management unit 7, a master database management unit 8, an electronic catalog dictionary editing database 14, a BSU code change management editing database 16, an electronic catalog dictionary master database 20, and a BSU code change management master database 22.

The dictionary editor 1 newly creates or edits the electronic catalog dictionary data 10. In this embodiment, this dictionary editor 1 can store the newly created or edited electronic catalog dictionary data 10 into the electronic catalog dictionary editing database 14 or the electronic catalog dictionary master database 20, and read out the electronic catalog dictionary data 10 from the electronic catalog dictionary editing database 14 or the electronic catalog dictionary master database 20 and edit them.

The BSU code change management function 2 has a summary generation function 3 and a BSU code update function 4. The summary generation function 3 generates a summary of changes by deleting redundant portion from the BSU code change data 9 at a time of storing the electronic catalog dictionary data 10. The BSU code update function 4 updates the BSU codes in the electronic cataqlog dictionary data 10 according to the generated summary and BSU code issuance rules 11.

The dictionary change status detection function 5 detects how BSU codes will be affected by the editing of the electronic catalog dictionary data 10 made by the dictionary editor 1 according to change type discrimination rules 12, and generates the BSU code change data 9.

The dictionary system quality check function 6 checks a quality of the updated electronic catalog dictionary data 10 according to quality check rules 13, and generates dictionary system quality data 26.

The editing database management unit 7 manages data input/output with respect to the electronic catalog dictionary editing database 14 and the BSU code change management editing database 16.

The master database management unit 8 manages data input/output with respect to the electronic catalog dictionary master database 20 and the BSU code change management master database 22.

The electronic catalog dictionary data 10 updated as a result of the editing or the like will be stored into the electronic catalog dictionary editing database 14 by the editing database management unit 7, as editing electronic catalog dictionary data 15. Also, the BSU code change data 9 that became the summary and the dictionary system quality data 26 are stored into the BSU code change management editing database 16 by the editing database management unit 7 similarly, as editing BSU code change data 17 and editing dictionary system quality data 19 respectively. At a time of storing these data, the editing database management unit 7 generates and manages Revision Tree data 18 describing relationships among these data in order to carry out the revision management of the dictionary.

Among the electronic catalog dictionary data 15 stored in the electronic catalog dictionary editing database 14, data to be used as a disclosure version which have a high level of completeness will be sent to the master database management unit 8, and managed in the electronic catalog dictionary master database 20 as master electronic catalog dictionary data 21. At the same time, the corresponding editing BSU code change data 17 and the corresponding editing dictionary system quality data 19 will be also stored in the BSU code change management master database 22 as master BSU code change data 23 and master dictionary system quality data 25 respectively. At a time of storing these data, the master database management unit 8 generates and manages Version Tree data 24 describing relationships among these data in order to carry out the version management of the dictionary.

(Configuration of the Electronic Catalog Dictionary Data)

Next, the contents of the electronic catalog dictionary data 10 or 15 to be stored in the electronic catalog dictionary editing database 14 and edited by the dictionary editor 1 will be described. FIG. 2 to FIG. 4 show exemplary configurations of the electronic catalog dictionary data 10 or 15.

FIG. 2 shows an example of class data in the electronic catalog dictionary data 10 or 15, where one line indicates information of one class. In this information, a "CID" which is an ID for identifying the class internally, a "BSU" which describes a BSU code of the class, and a "parent class CID" which describes a CID of a class that is a parent on the hierarchy structure of classes will be automatically assigned by the dictionary editor 1 and the BSU code change management function 2 in this embodiment. Note that the electronic catalog dictionary data 10 or 15 in this embodiment contain associated information of the class as specified by IS013584 including a "Preferred Name" which indicates a name of the class, and this will be entered by a user. Also, a value of a "data quality level" in this electronic catalog dictionary data 10 or 15 will be written by the dictionary system quality check function 6.

FIG. 3 shows an example of attribute data in the electronic catalog dictionary data 10 or 15, where one line indicates information of one attribute. In this information, a "PID" which is an ID for identifying the attribute internally and a "BSU" which describes a BSU code of the attribute will be automatically assigned by the dictionary editor 1 and the BSU code change management function 2 in this embodiment. There is also associated information of the attribute as specified by IS013584 including a "Preferred Name" which indicates a name of the attribute, and this will be entered by a user. Also, a value of the data quality level will be written by the dictionary system quality check function 6.

FIG. 4 shows an example of class-attribute relationship data in the electronic catalog dictionary data 10 or 15, where one line indicates information of one class-attribute relationship. In this information, a "CID_scope" describes a class for which this attribute is defined, a "Visible" describes a list of classes that can be referred by this attribute, and "Applicable" describes a list of classes to which this attribute can be applied.

(Configuration of the BSU Code Change Data)

Next, the contents of the BSU code change data 9 or 17 to be generated by the editing of the electronic catalog dictionary data 10 or 15 by the dictionary editor 1 and stored in the BSU code change management editing database 16 will be described. FIG. 5 and FIG. 6 show exemplary configurations of the BSU code change data 9 or 17.

FIG. 5 shows an example of BSU code change data for classes in the BSU code change data 9 or 17 where one line indicates information of one BSU code change event. In this information, a "Status" indicates an event type which can take four values (VUP, RUP, NEW, OOD). Here, "VUP" and "RUP" indicate change events in accordance with the Version/Revision management specification of IS013584 as shown in FIGS. 28A and 28B. Also, "NEW" indicates one for which there is a need to newly issue a BSU code as a result of a change event. Also, "OOD" indicates one for which there is a need to retire a BSU code as it is excluded from the dictionary system.

For each "Status", "CID" of the class with respect to which the change is made, "BSU", and "Refer_to" and "Same_as" which indicate relationships of generation changes among classes are given. Using these two relationships, it is possible to access the registered class through the generation change, even in the case of making access to the dictionary by using a retired BSU code which is already excluded from the dictionary system.

FIG. 6 shows an example of BSU code change data for attributes in the BSU code change data 9 or 17, where one line indicates information of one BSU code change event. In this information, a "Status" indicates an event type which can take four values (VUP, RUP, NEW, OOD). Here, "VUP" and "RUP" indicate change events in accordance with the Version/Revision management specification of IS013584 as shown in FIGS. 28A and 28B. Also, "NEW" indicates one for which there is a need to newly issue a BSU code as a result of a change event. Also, "OOD" indicates one for which there is a need to retire a BSU code as it is excluded from the dictionary system.

For each "Status", "PID" of the attribute with respect to which the change is made, "BSU", and "Refer_to" and "Same_as" which indicate relationships of generation changes among attributes are given. Using these two relationships, it is possible to access the registered attribute through the generation change, even in the case of making access to the dictionary by using a retired BSU code which is already excluded from the dictionary system.

(Configuration of Version Tree Data)

Next, the Version Tree data to be stored in the BSU code change management editing database 16 or the BSU code change management master database 22 will be described.

Figure 7:
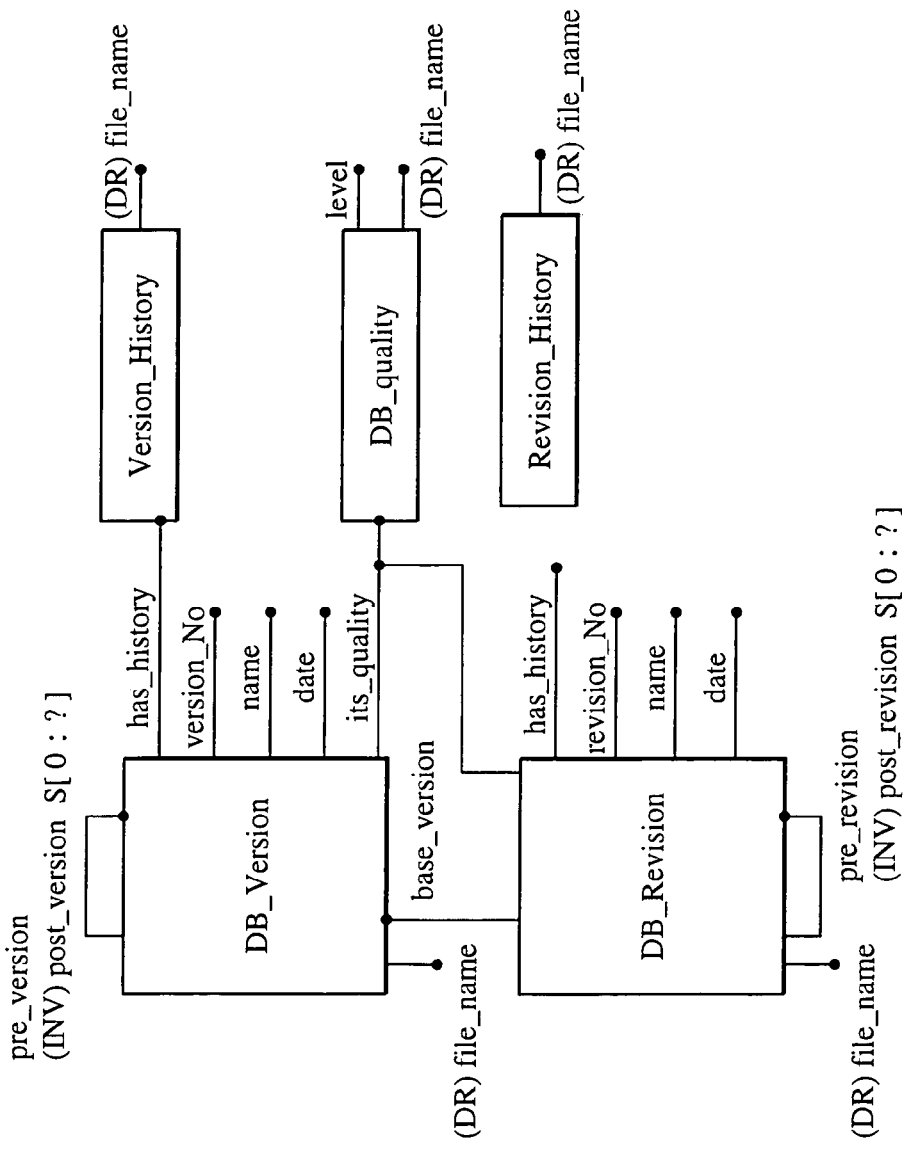
FIG. 7 is a diagram showing an exemplary model for expressing version tree data and revision tree data used by the electronic catalog maintenance system of FIG. 1.

FIG. 7 shows a model for expressing the Version Tree data 24 and the Revision Tree data 18 used in FIG. 1 in terms of EXPRESS-G, which is an ER model in which a rectangle represents an entity and a line represents a relation.

In FIG. 7, a "DB_Version" entity represents the master electronic catalog dictionary data 21, a "Version_History" entity represents the master BSU code change data 23, a "DB_Revision" entity represents the editing electronic catalog dictionary data 10, a "Revision_History" entity represents the editing BSU code change data 17, and a "DB_quality" entity represents the editing dictionary system quality data 19 and the master dictionary system quality data 25.

Figure 8:
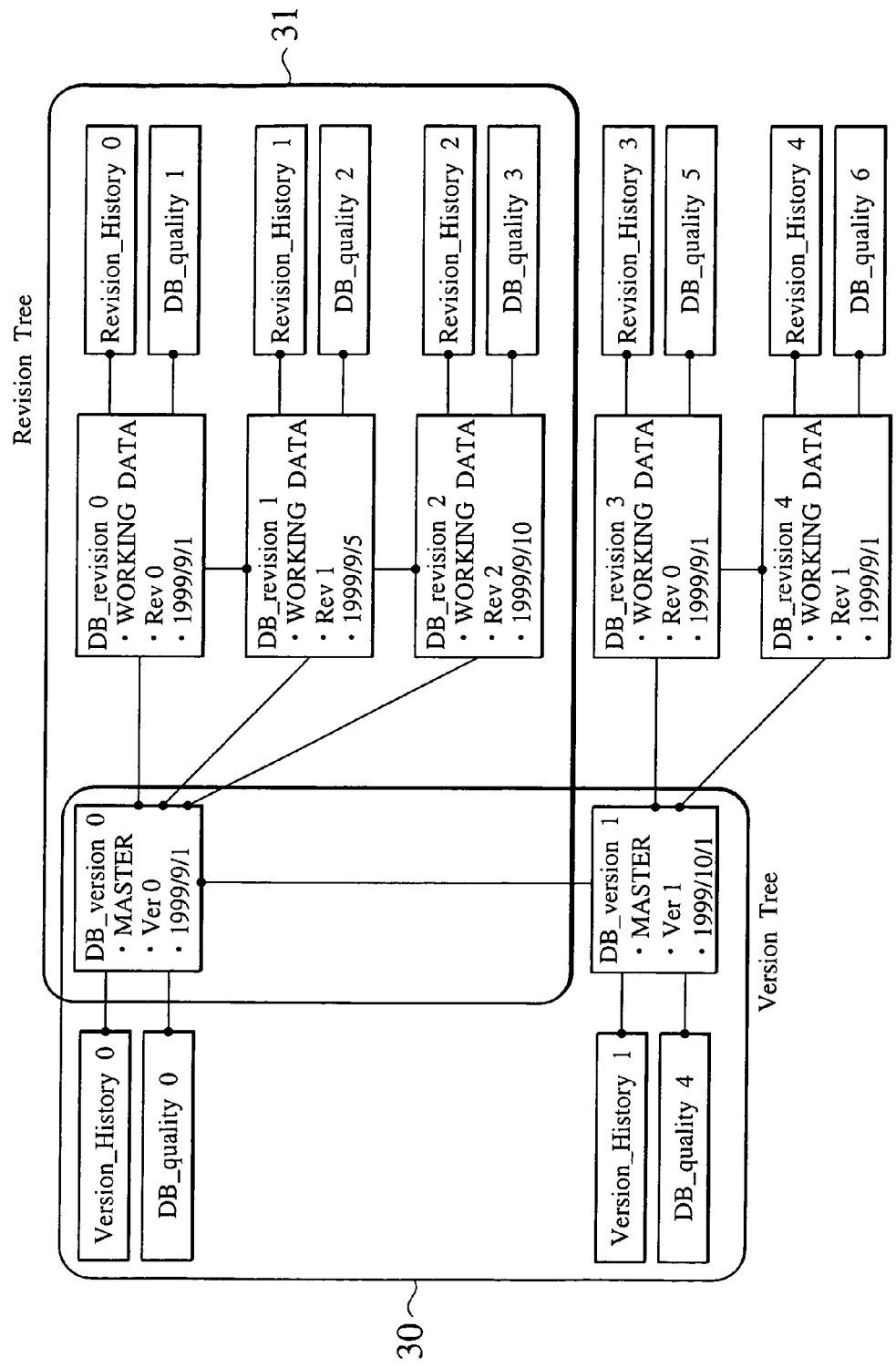
FIG. 8 is a diagram showing an exemplary data description of version tree data and revision tree data used by the electronic catalog maintenance system of FIG. 1.

FIG. 8 shows an exemplary data description of the Version Tree data 24 and the Revision Tree data 18, which is described according to a model shown in FIG. 7, and which will be used as information for the version management of each data. In FIG. 8, a portion enclosed by an enclosure 30 represents the Version Tree data 24, and a portion enclosed by an enclosure 31 represents the Revision Tree data 18.

(Configuration of the Dictionary System Quality Data)

Next, the contents of the dictionary system quality data 26 to be generated by the dictionary system quality check function 6 will be described.

FIG. 9 shows an example of the dictionary system quality data 26, where quality evaluation values are described from viewpoints of classes, attributes, and the entire dictionary itself. These values are calculated by the dictionary system quality check function 6 by evaluating the electronic catalog dictionary data 10 and the BSU code change data 9 according to the quality check rules 13.

(Processing by the Electronic Catalog Maintenance System)

Figure 10:
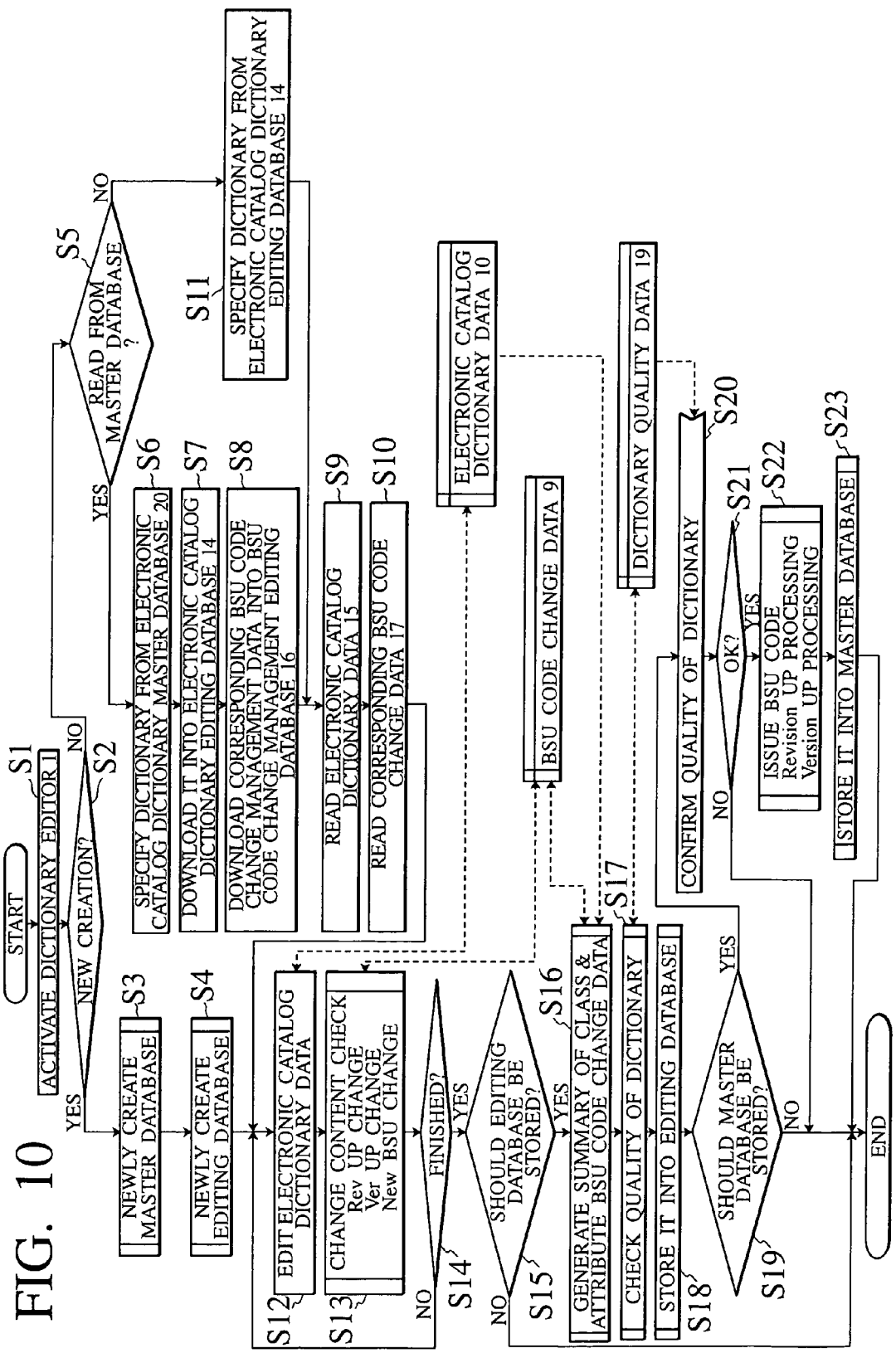
FIG. 10 is a flow chart for an overall processing of the electronic catalog maintenance system of FIG. 1.

The electronic catalog maintenance system of this embodiment in the above described configuration carries out the electronic catalog maintenance operation as follows. FIG. 10 shows a flow chart for an overall processing to be carried out by the electronic catalog maintenance system of this embodiment.

As shown in FIG. 10, when the dictionary editor 1 is activated (step S1), whether the electronic catalog dictionary data to be edited is a new one or an existing one is judged (entered) (step S2). Then, in the case of newly creating an electronic catalog dictionary, the processing for generating a new dictionary is carried out at the steps S3 and S4, whereas in the case of reading existing data, whether that data is stored in the electronic catalog dictionary editing database 14 or the electronic catalog dictionary master database 20 is judged (step S5). In the case of reading from the electronic catalog dictionary editing database 14, the processing of the step S11 is carried out, whereas in the case of reading from the electronic catalog dictionary master database 20, the processing of the steps S6 to S10 is carried out.

Next, the electronic catalog dictionary data 10 so created or read will be changed by the editing processing of the step S12. Then, the content of that change is checked by the processing of the step S13. Namely, the dictionary change status detection function 5 compares the editing content made by the dictionary editor 1 with the change type discrimination rules 12 to determine the editing content as one of a Revision UP change, a Version UP change and a New BSU change, and generates the check result as the BSU code change data 9.

When it is desired to store the edited electronic catalog dictionary data 10 (step S14 YES and step S15 YES), it is stored into the electronic catalog dictionary editing database 14 (step S18) after the summary generation processing of the step S16 and the quality check processing of the step S17. On the other hand, when it is desired to store the electronic catalog dictionary data 10 with a high level of completeness as the master data (step S19 YES), it is stored into the electronic catalog dictionary master database 20 (step S23) after the quality of the dictionary is confirmed at the steps S20 and S21, and the BSU code is issued and the Version/Revision update is carried out at the step S22.

Figure 11:
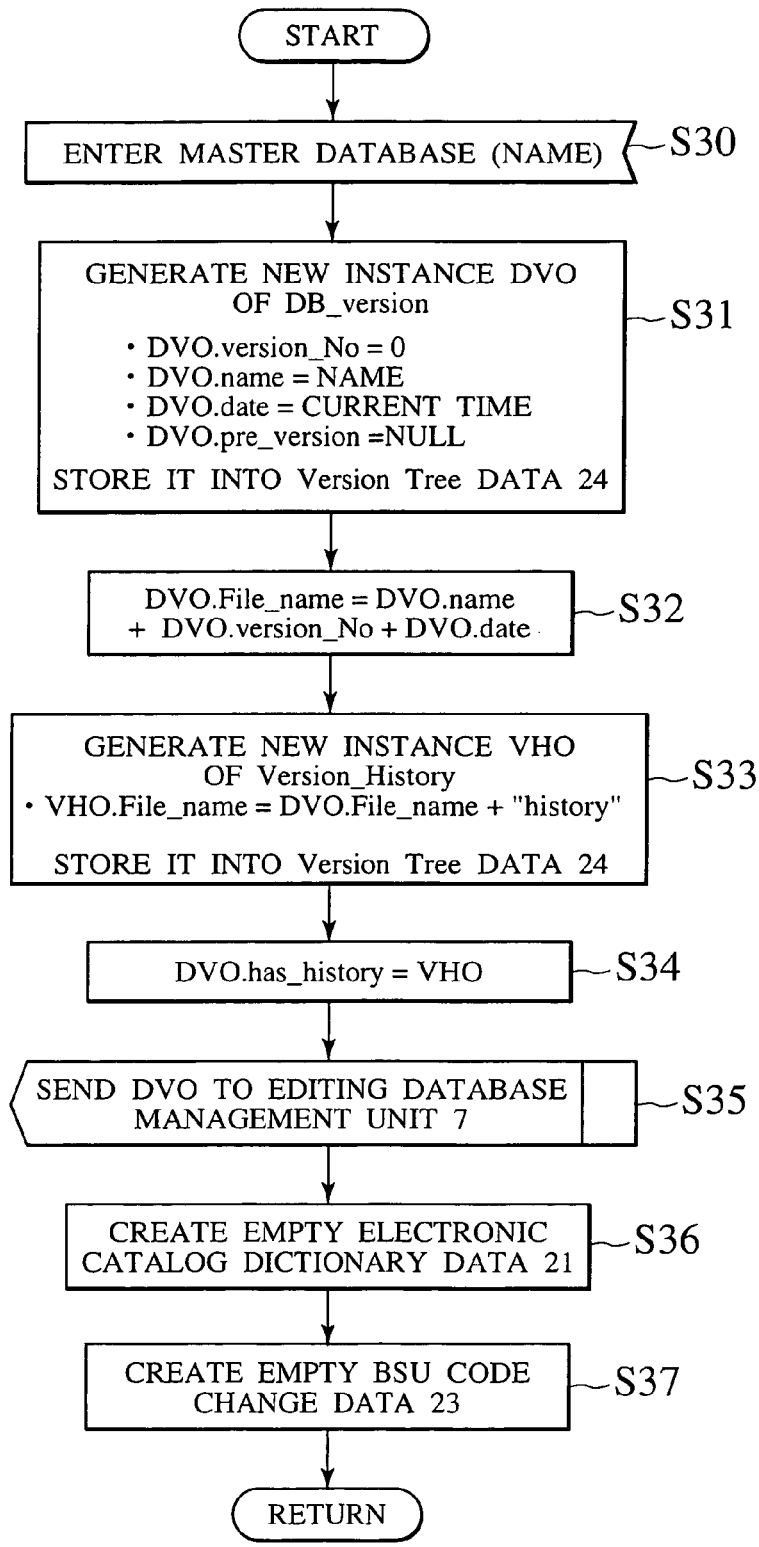
FIG. 11 is a flow chart for a processing by a master database management unit at the step S3 of FIG. 10.

In the following, each processing will be described in further detail. FIG. 11 shows a flow chart for a processing to be carried out by the master database management unit 8 in the processing of the step S3 of FIG. 10, that is the processing for newly creating the electronic catalog dictionary data 10.

As shown in FIG. 11, in the processing of the step S3 described above, when the master database (name) is entered at the step S30, the Version Tree data 24 based on a model shown in FIG. 7 is created and stored by the steps S31 to S35, and the necessary information is transmitted to the editing database management unit 7 by the step S35. Then, an empty electronic catalog dictionary data 21 is created and stored by the step S36 and an empty BSU code change data 23 is created and stored by the step S37.

Figure 12:
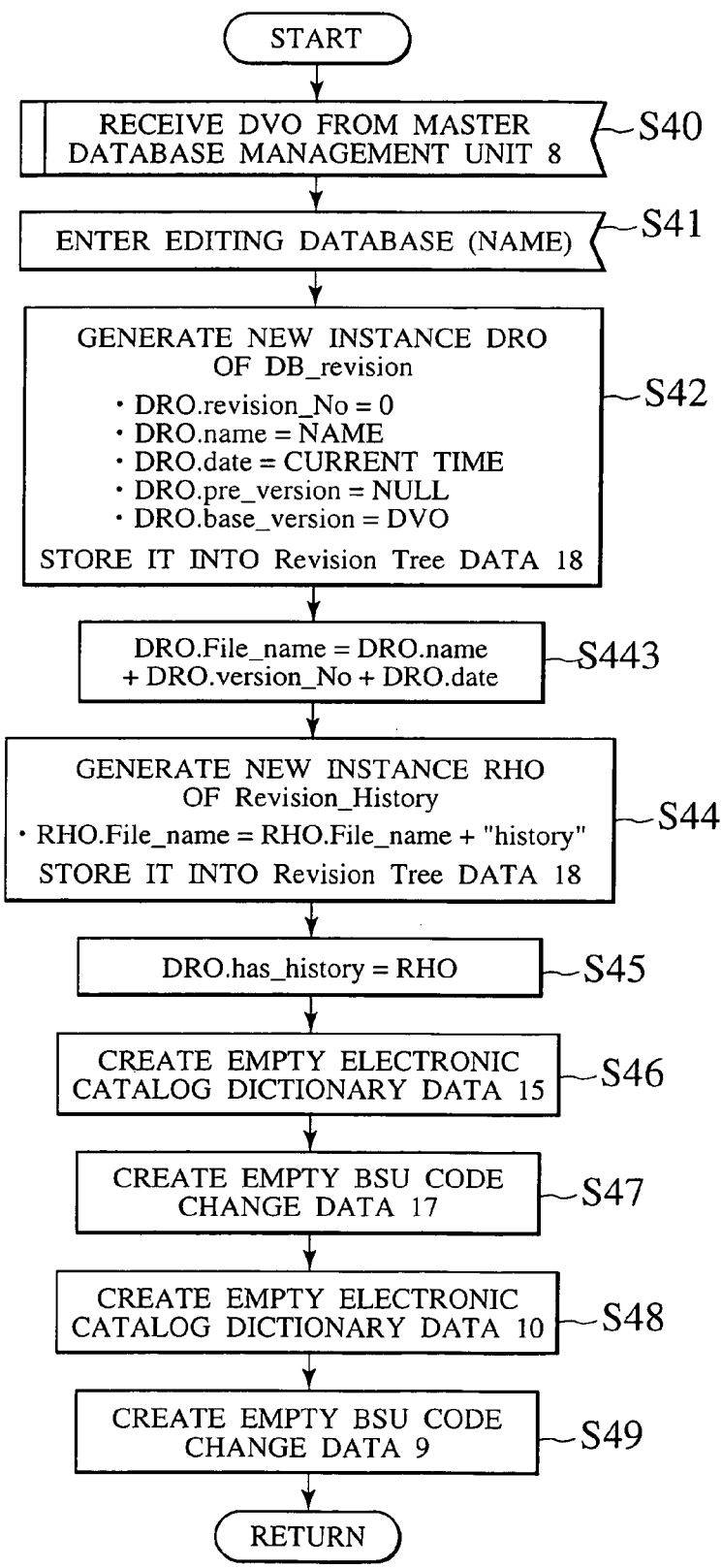
FIG. 12 is a flow chart for a processing by an editing database management unit at the step S4 of FIG. 10.

FIG. 12 shows a flow chart for the processing of the step S4 in FIG. 10, that is a processing to be carried out by the editing database management unit 7 in the processing for newly creating the electronic catalog dictionary data 10.

As shown in FIG. 12, the necessary information is received from the master database management unit 8 at the step S40, and the Revision Tree data 18 is created and stored by the steps S41 to S45. Then, an empty electronic catalog dictionary data 15 is created and stored by the step S46 and an empty BSU code change data 17 is created and stored by the step S47. At the same time, an empty electronic catalog dictionary data 10 is created and stored by the step S48 and an empty BSU code change data 9 is created and stored by the step S49.

Figure 13:
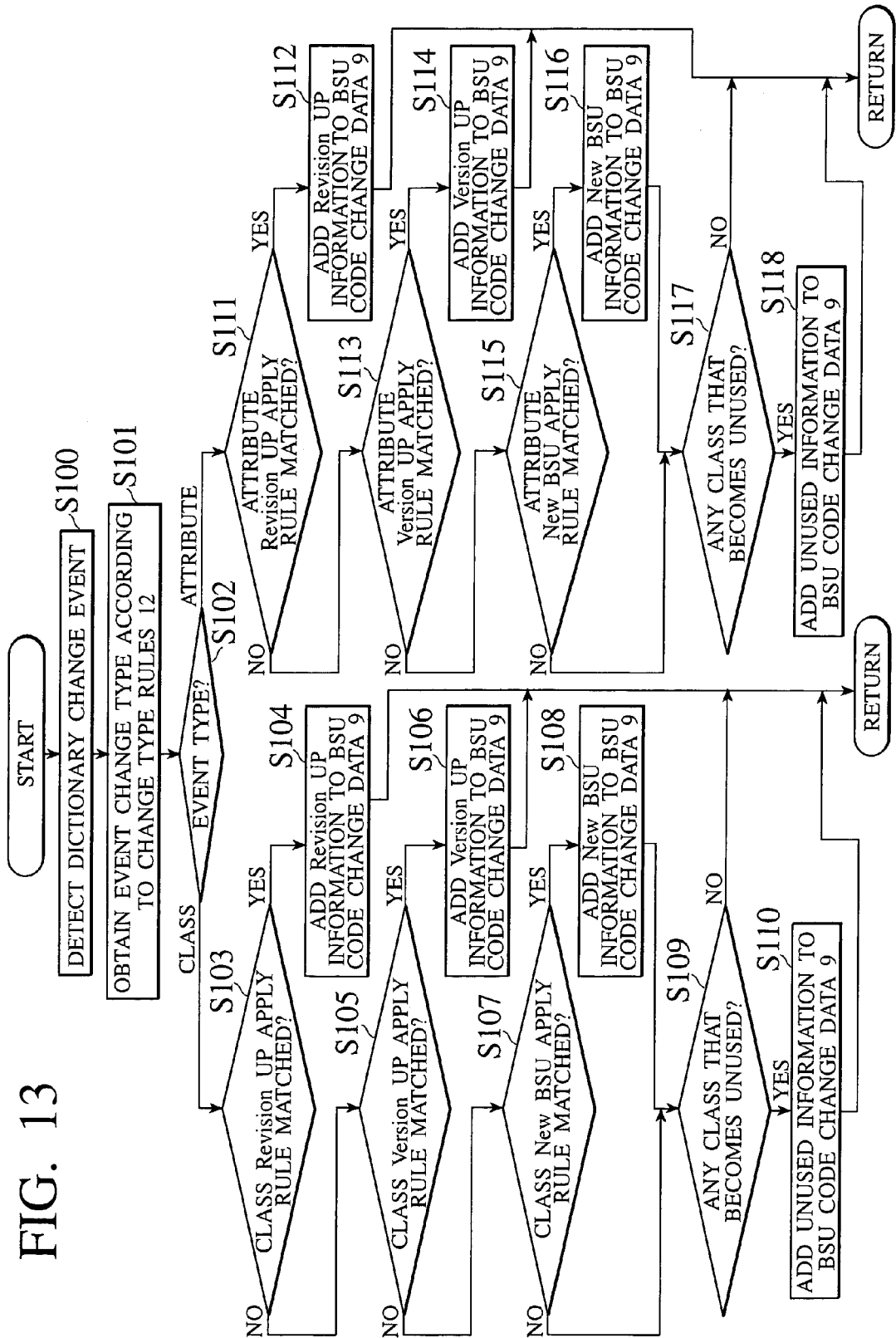
FIG. 13 is a flow chart for a processing by a dictionary change status detection function at the step S13 of FIG. 10.

FIG. 13 shows a flow chart for the processing of the step S13 in FIG. 10, that is a processing to be carried out by the dictionary change status detection function 5 in the processing for checking the change content of the edited electronic catalog dictionary data 10.

As shown in FIG. 13, the dictionary change event is detected at the step S100 and discriminated according to the change type discrimination rules 12 shown in FIG. 14 at the step S101. Then, depending on whether the event type is that related to the class or that related to the attribute (step S102), the subsequent steps S103 to S110 are carried out when the event type is that related to the class, whereas the subsequent steps S111 to S118 are carried out when the event type is that related to the attribute, so as to generate the BSU code change data 9.

FIG. 14 shows an example of the change type discrimination rules 12 describing the rules to be used in the processing of FIG. 13.

As shown in FIG. 14, the change type discrimination rules 12 are largely divided into rules for the product class change and the rules for the attribute change, and each rule describes a condition for judging whether each change is Revision UP, Version UP or New BSU, and a processing method suitable for each type. Note that these judgement condition and processing method are described in the IF-THEN format in this embodiment, but they may be described in any other format.

Then, as a result of the judgement according to the change type discrimination rules 12, if the change of the BSU code change data 9 is related to the class, whether that change is Revision UP, Version UP, or New BSU is checked, whether there is a class to be retired or not is checked, and the BSU code change data 9 is changed according to the rule to be applied. If the change of the BSU code change data 9 is related to the attribute, the rule to be applied is checked similarly.

Figure 15:
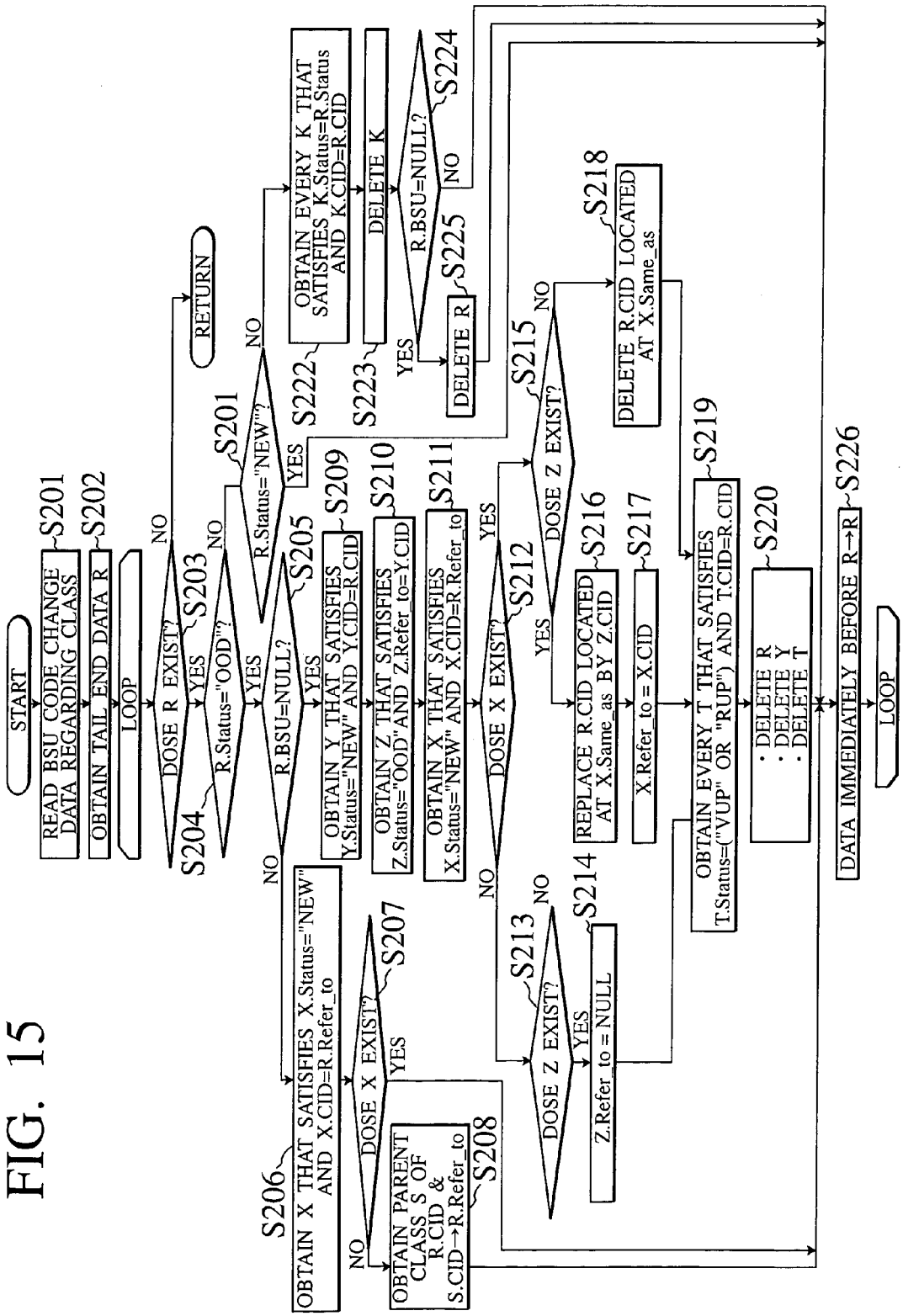
FIG. 15 is a flow chart for a processing by a summary generation function with respect to class data at the step S16 of FIG. 10.

FIG. 15 shows a flow chart for a processing to be carried out by the summary generation function 3 with respect to the class data in the processing of the step S16 of FIG. 10. Here, the processing is branched according to "Status" of each event described in the BSU code change data 9 and the status of BSU code issuance. By this processing, the redundant operation can be removed from the editing operation, and only significant changes including the BSU code change can be extracted.

Among symbols used in FIG. 15, "Status" indicates the "Status" attribute of the class BSU code change data, "BSU" indicates the "BSU" attribute of the class BSU code change data, "CID" indicates the "CID" attribute of the class BSU code change data, "Same_as" indicates "Same_as" attribute of the class BSU code change data, "Refer_to" indicates the "Refer_to" attribute of the class BSU code change data, and "A.Status" indicates the "Status" attribute value of the class BSU code change data A.

Also, among alphabets attached to these symbols, "R" indicates the tail end data of the class BSU code change data, "X" indicates the class BSU code change data whose CID value is equal to "R.Refer_to" value, "S" indicates the class BSU code change data whose CID value is that of the parent (upper level) class of "R.CID" value and whose "Status" value is "NEW", "Y" indicates the class BSU code change data whose "Status" value is "NEW" and whose CID value is equal to "R.CID" value, "Z" indicates the class BSU code change data whose "Status" value is "OOD" and whose "Refer_to" value is equal to "Y.CID" value, "T" indicates the class BSU code change data whose "Status" value is "VUP" or "RUP" and whose CID value is equal to "R.CID" value, and "K" indicates the class BSU code change data whose "Status" value is equal to "R.Status" value and whose CID value is equal to "R.CID" value.

First, the BSU code change data related to the class is read (step S201), the tail end data R is detected (step S202), and the processing is terminated when the data R does not exist (step S203 NO), or otherwise the processing from the step S204 on is carried out.

In the processing from the step S204 on, whether "R.Status" value is "OOD" or not is judged (step S204), and if "R.Status" is "OOD", whether "R.BSU" value is "NULL" or not is judged (step S205).

When it is judged that "R.BSU" value is "NULL" at the step S205, Y for which "Y.Status" value is "NEW" and "Y.CID" value is equal to "R.CID" value is obtained, Z for which "Z.Status" value is "OOD" and "Z.Refer_to" value is equal to "Y.CID" value is obtained, and X for which "X.Status" value is "NEW" and "X.CID" value is equal to "R.Refer_to" value is obtained (steps S209, S210, S211). Then, whether such X and Z exist or not is judged (steps S212, S213, S215). Then, depending on a combination of the existing X and Z, "NULL" is substituted into "Z.Refer_to" (step S214), "R.CID" is replaced by "Z.CID" and "X.CID" is substituted into "X.Refer_to" (steps S216, S217), "R.CID" is deleted (step S218), every T for which "T.Status" is "VUP" or "RUP" and "T.CID" value is equal to "R.CID" value is obtained (step S219), and R, Y and T are deleted (step S220).

When it is judged that "R.BSU" value is not "NULL" at the step S205, X for which "X.CID" value is equal to "R.Refer_to" value is obtained (step S206), and if such X does not exist (step S207 NO), the parent class S of "R.CID" is obtained and "S.CID" is set to "R.Refer_to" (step S208).

On the other hand, when it is judged that the "R.Status" value is not "OOD" at the step S204, whether "R.Status" value is "NEW" or not is judged (step S221), and if it is "NEW", every K for which "K.Status" value is equal to "R.Status" value and "K.CID" value is equal to "R.CID" value is obtained (step S222) and K is deleted (step S223). Then, whether "R.BSU" is "NULL" or not is judged (step S224), and if so R is deleted (step S225).

After R is obtained in this way, the data immediately before R is substituted into this obtained data R (step S226), and the next processing is started by the loop processing.

Figure 16:
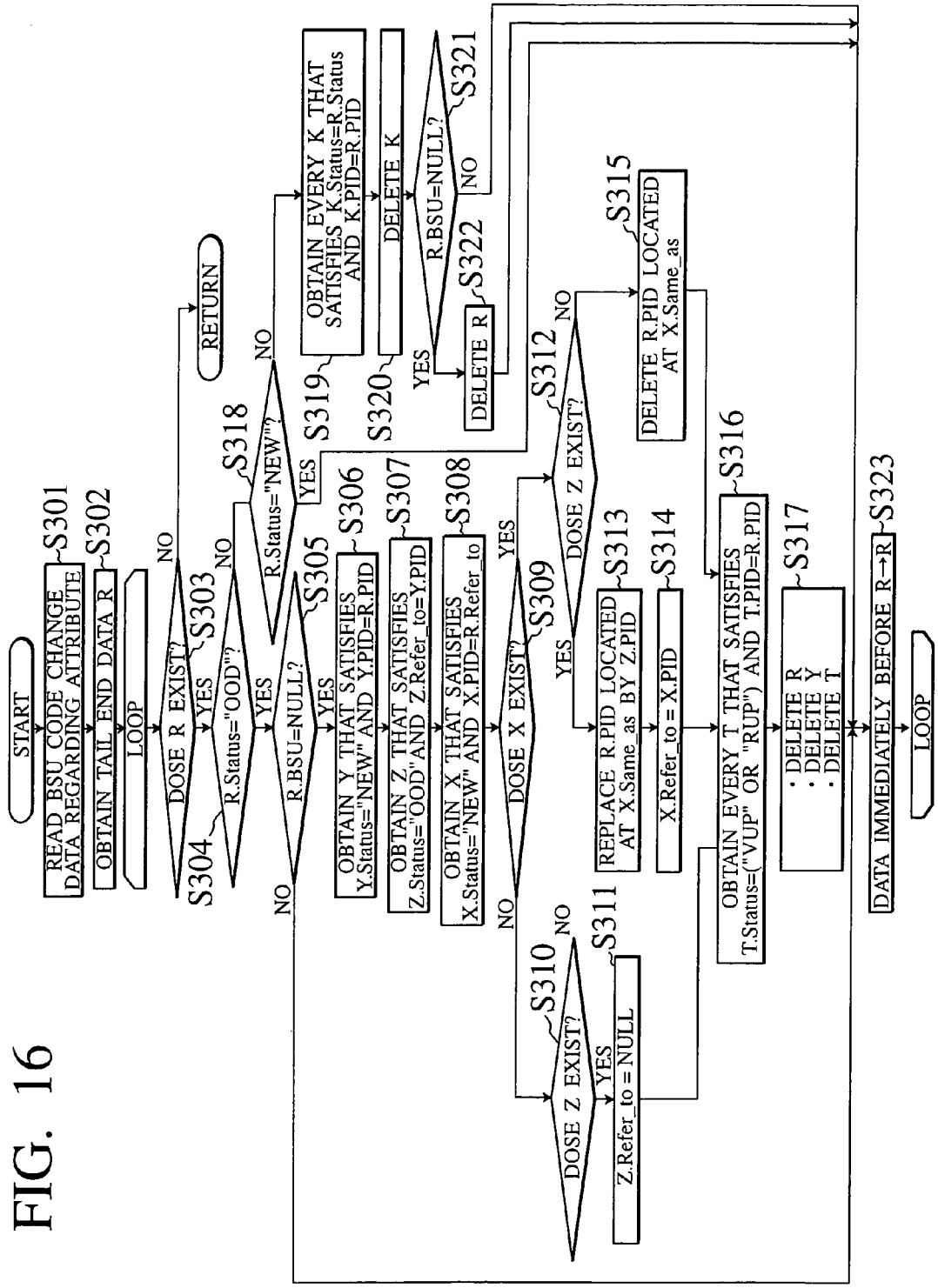
FIG. 16 is a flow chart for a processing by a summary generation function with respect to attribute data at the step S16 of FIG. 10.

FIG. 16 shows a flow chart for a processing to be carried out by the summary generation function 3 with respect to the attribute in the processing of the step S16 of FIG. 10. Here, the processing is branched according to "Status" of each event described in the BSU code change data 9 and the status of BSU code issuance, similarly as FIG. 15. By this processing, the redundant operation such as a change related to the class that was once newly created but then deleted on the second thought, for example, can be removed from the editing operation, and only significant changes including the BSU code change can be extracted.

Among symbols used in FIG. 16, "PID" indicates the "PID" attribute of the attribute BSU code change data, and "A.PID" indicates the "PID" attribute value of the class BSU code change data A. Also, among alphabets attached to these symbols, "R" indicates the tail end data of the attribute BSU code change data, "X" indicates the attribute BSU code change data whose "Status" value is "NEW" and whose PID value is equal to "R.Refer_to" value, "Y" indicates the attribute BSU code change data whose "Status" value is "NEW" and whose PID value is equal to "R.PID" value, "Z" indicates the attribute BSU code change data whose "Status" value is "OOD" and whose "Refer_to" value is equal to "Y.PID" value, "T" indicates the attribute BSU code change data whose "Status" value is "VUP" or "RUP" and whose PID value is equal to "R.PID" value, and "K" indicates the attribute BSU code change data whose "Status" value is equal to "R.Status" value and whose PID value is equal to "R.PID" value.

First, the BSU code change data related to the attribute is read (step S301), the tail end data R is detected (step S302), and the processing is terminated when the data R does not exist (step S303 NO), or otherwise the processing from the step S304 on is carried out.

In the processing from the step S304 on, whether "R.Status" value is "OOD" or not is judged (step S304), and if "R.Status" is "OOD", whether "R.BSU" value is "NULL" or not is judged (step S305).

When it is judged that "R.BSU" value is "NULL" at the step S305, Y for which "Y.Status" value is "NEW" and "Y.PID" value is equal to "R.PID" value is obtained, Z for which "Z.Status" value is "OOD" and "Z.Refer_to" value is equal to "Y.PID" value is obtained, and X for which "X.Status" value is "NEW" and "X.PID" value is equal to "R.Refer_to" value is obtained (steps S306, S307, S308). Then, whether such X and Z exist or not is judged (steps S309, S310, S312). Then, depending on a combination of the existing X and Z, "NULL" is substituted into "Z.Refer_to" (step S311), "R.PID" is replaced by "Z.PID" and "X.PID" is substituted into "X.Refer_to" (steps S313, S314), "R.PID" is deleted (step S315), every T for which "T.Status" is "VUP" or "RUP" and "T.PID" value is equal to "R.PID" value is obtained (step S316), and R, Y and T are deleted (step S317).

On the other hand, when it is judged that the "R.Status" value is not "OOD" at the step S304, whether "R.Status" value is "NEW" or not is judged (step S318), and if it is "NEW", every K for which "K.Status" value is equal to "R.Status" value and "K.PID" value is equal to "R.PID" value is obtained (step S319) and K is deleted (step S320). Then, whether "R.BSU" is "NULL" or not is judged (step S321), and if so R is deleted (step S322).

After R is obtained in this way, the data immediately before R is substituted into this obtained data R (step S323), and the next processing is started by the loop processing. When it is judged that "R.BSU" value is not "NULL" at the step S305, and when it is judged that "R.Status" value is "NEW" at the step S318, this step S323 is carried out immediately.

(Change of the BSU Code)

In the following, the concrete examples of the electronic catalog maintenance by the electronic catalog maintenance system described above will be described. FIG. 17 shows an exemplary BSU code change by the dictionary data editing processing of the step S12 of FIG. 109.

First, as shown in a part (a) of FIG. 17, suppose that B1 is deleted and the note of C0 is changed. As a result, as shown in a part (b) of FIG. 17, C2 and C3 located below the deleted B1 are directly connected below A0 as C4 and C5, and Revision UP of C0 for which the note is changed is carried out. At this point, C2 and C3 located below the deleted B1 are set in retired states, and V4, V5 and V6 that are belonging only to B1, C2 and C3 are also set in retired states.

Next, when C4 and C5 are merged, as shown in a part (c) of FIG. 17, a new C6 is created instead of the merged C4 and C5, and C4 and C5 are set in retired states. At this point, V7, V8, V9 and V10 that are belonging only to the merged C4 and C5 are also set in retired states, and V11, V12, V13 and V14 are newly added instead of them.

(Summary Generation)

In the case of making such a change in the electronic catalog dictionary data, the BSU code change data for the class and the attribute created by the change and their summary will be generated as follows.

A part (a) of FIG. 18 shows the class BSU code change data created by the dictionary change status detection function 5 when the operations of FIG. 17 are carried out. Then, by carrying out the processing of FIG. 15 described above with respect to these data, these data are updated as shown in parts (b) to (e) of FIG. 18. In this way, it can be seen that only the significant change operations for the class are extracted.

FIG. 19 shows the attribute BSU code change data created by the change of FIG. 17 and a manner of generating their summary.

A part (a) of FIG. 19 shows the attribute BSU code change data created by the dictionary change status detection function 5 when the operations of FIG. 17 are carried out. Then, by carrying out the processing of FIG. 16 described above with respect to these data, these data are updated as shown in parts (b) to (i) of FIG. 19. In this way, it can be seen that only the significant change operations for the attribute are extracted.

(Quality Check of the Dictionary)

Figure 20:
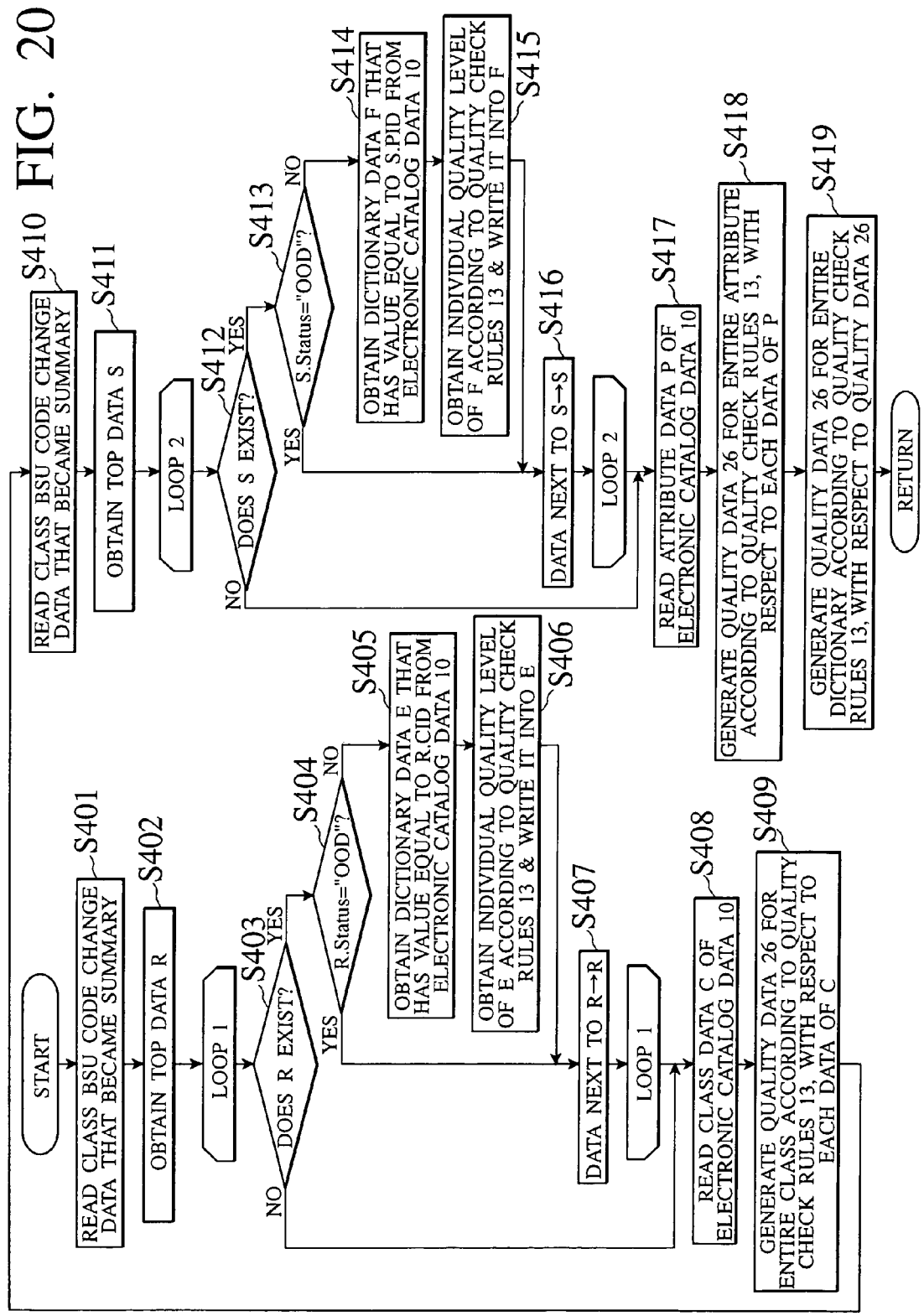
FIG. 20 is a flow chart for a processing by a dictionary system quality check function at the step S17 of FIG. 10.

Next, the operation of the dictionary quality check function, which is one of the functions of the electronic catalog maintenance system of this embodiment, will be described. FIG. 20 shows a flow chart for a processing of the dictionary system quality check function 6 to generate the dictionary system quality data 26 in the processing of the step S17 of FIG. 10.

First, by the steps S401 to S407 of FIG. 20, the class BSU code change data that became the summary are read, a top data R is obtained, the quality of individual class is evaluated according to the quality check rules 13, and its value is written into the "data quality level" field of the class data.

Here, as the quality check rules 13, tables formed by the evaluation conditions and the evaluation functions as shown in FIG. 21A can be used, for example. As shown in FIG. 21A, the quality check rules 13 can be formed from the evaluation of individual class, the evaluation of individual attribute, the evaluation regarding the class hierarchy structure, the evaluation regarding the attribute overlaps, and the evaluation regarding the entire dictionary, for example. Note that the quality evaluation is made by calculating the quality level by using such quality check rules 13 in this embodiment, but it is also possible to account for the importance of associated items, and it is also possible to set evaluation functions based on different evaluation axes.

Then, at the steps S408 and S409, the overall quality of the class data such as the consistency of the hierarchy structure for example is evaluated according to the quality check rules 13, and added to the dictionary system quality data 26. In addition, at the steps S410 to S416, the quality of individual attribute is evaluated according to the quality check rules 13 and its value is written into the "data quality level" field of the attribute data.

Next, at the steps S417 and S418, the overall quality of the attribute data such as the overlapping existence of identical definitions for example is evaluated according to the quality check rules 13, and added to the dictionary system quality data 26. Then, at the step S419, the dictionary system quality data 26 are evaluated according to the quality check rules 13, and the quality level of the entire electronic catalog dictionary is calculated and added to the dictionary system quality data 26.

(Processing by the Editing Database Management Unit 7)

Figure 22:
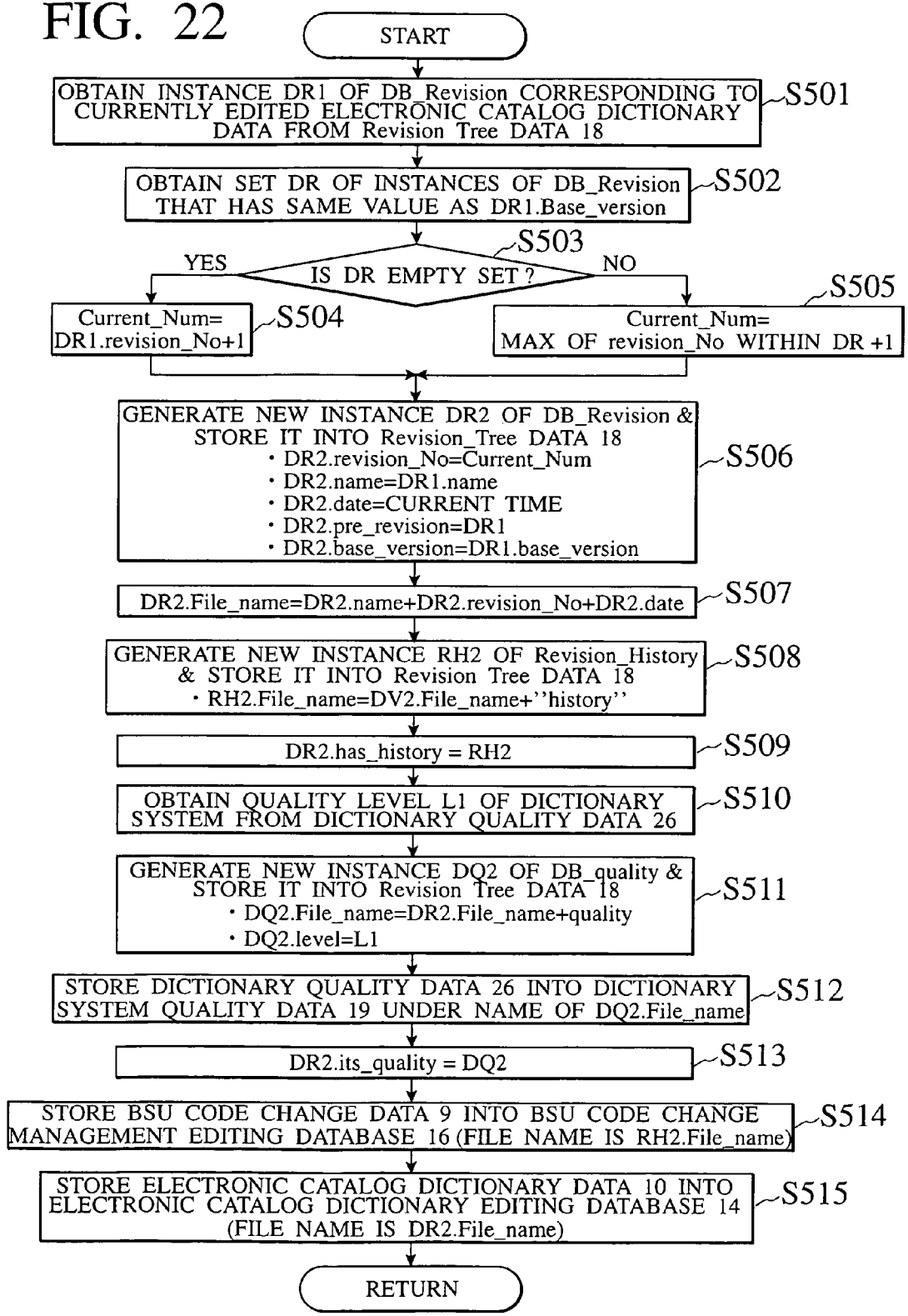
FIG. 22 is a flow chart for a processing by an editing database management unit at the step S18 of FIG. 10.

The data produced by each processing described above are stored by the editing database management unit 7. FIG. 22 shows a flow chart for a processing of the editing database management unit 7 to store data in the processing of the step S18 of FIG. 10.

As shown in FIG. 22, at the steps S501 to S509, the DB_Revision entity and the Revision_History entity for describing relationships between the BSU code change data 9 and the electronic catalog dictionary data 10 that are desired to be stored in order to carry out the revision management of the dictionary are generated, and stored into the Revision Tree data 18.

Next, at the step S510 to S513, the quality information of the dictionary is obtained from the dictionary system quality data 26, and the DB_quality entity is generated and stored in the Revision Tree data 18 similarly. Then, at the step S514, the BSU code change data 9 created by the summary generation function 3 are stored into the BSU code change management editing database 16 as the editing BSU code change data 17. Finally, at the step S515, the electronic catalog dictionary data 10 is stored into the electronic catalog dictionary editing database 14 as the editing electronic catalog dictionary data 15.

(Processing of BSU Codes)

Figure 23:
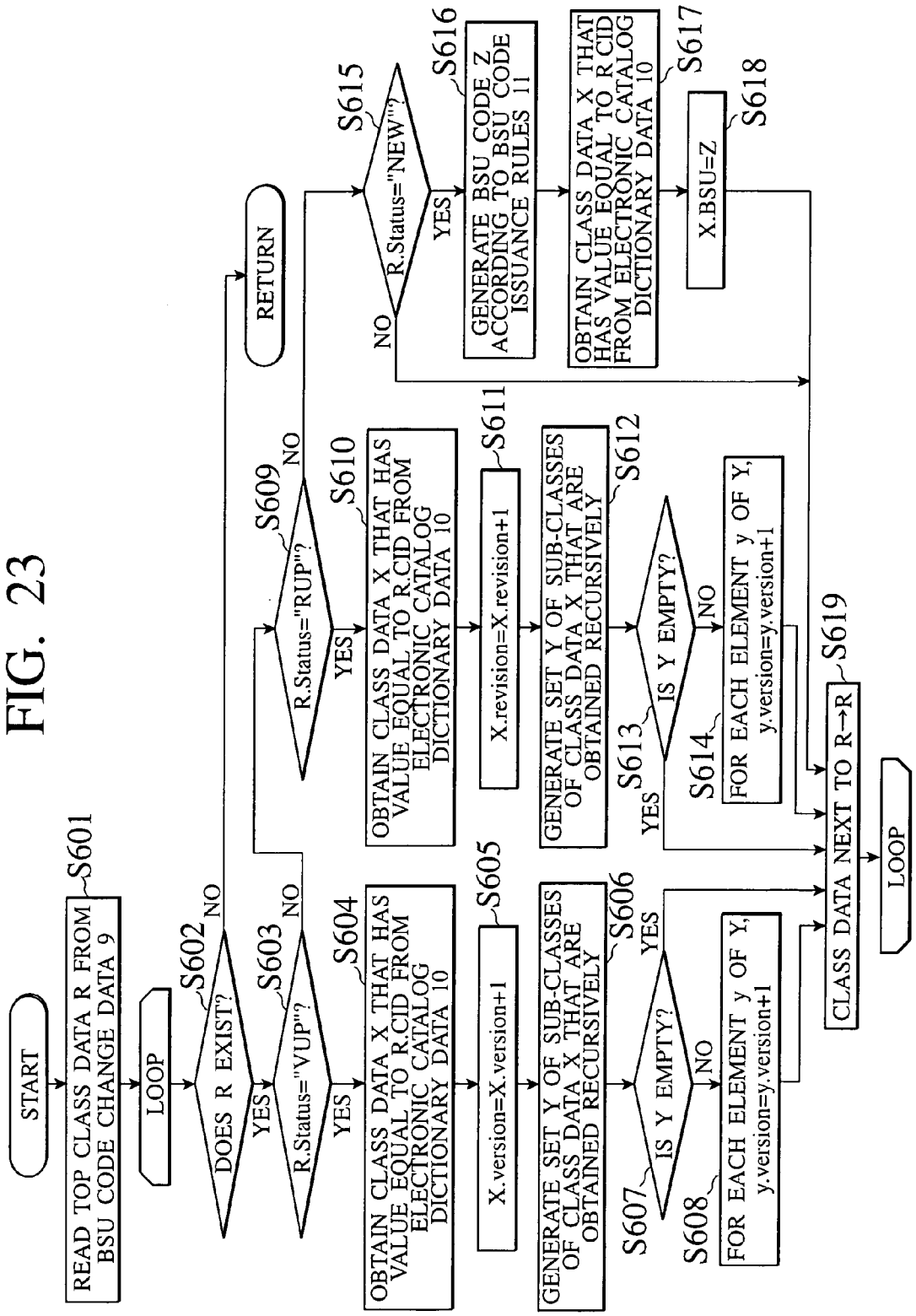
FIG. 23 is a flow chart for a processing by a BSU code update function with respect to class data at the step S22 of FIG. 10.

Next, the BSU code change management processing by the BSU code update function 4 will be described. FIG. 23 shows a flow chart for a processing by the BSU code update function 4 to update the class data in the processing of the step S22 of FIG. 10, and FIG. 24 shows a flow chart for a processing by the BSU code update function 4 to update the attribute data in the processing of the step S22 of FIG. 10.

In the case of the processing for updating the class data, as shown in FIG. 23, the processing is carried out according to the "Status" value of the BSU code change data 9 read by the step S601.

Namely, when it is judged that "Status" is "VUP" at the step S603, the Version UP is carried out at the steps S604 to S608. On the other hand, when it is judged that "Status" is not "VUP" at the step S603 and it is judged that "Status" is "RUP" at the step S609, the Revision UP is carried out at the steps S610 to S614. Else, when it is judged that "Status" is not "VUP" at the step S603 and it is judged that "Status" is not "RUP" at the step S609, whether "Status" is "NEW" or not is judged (step S615), and if "Status" is "NEW", the steps S616 to S618 are carried out according to the BSU code issuance rules 11 as shown in FIG. 21B, such that the new BSU code is issued and written into the BSU field of the class data.

Figure 24:
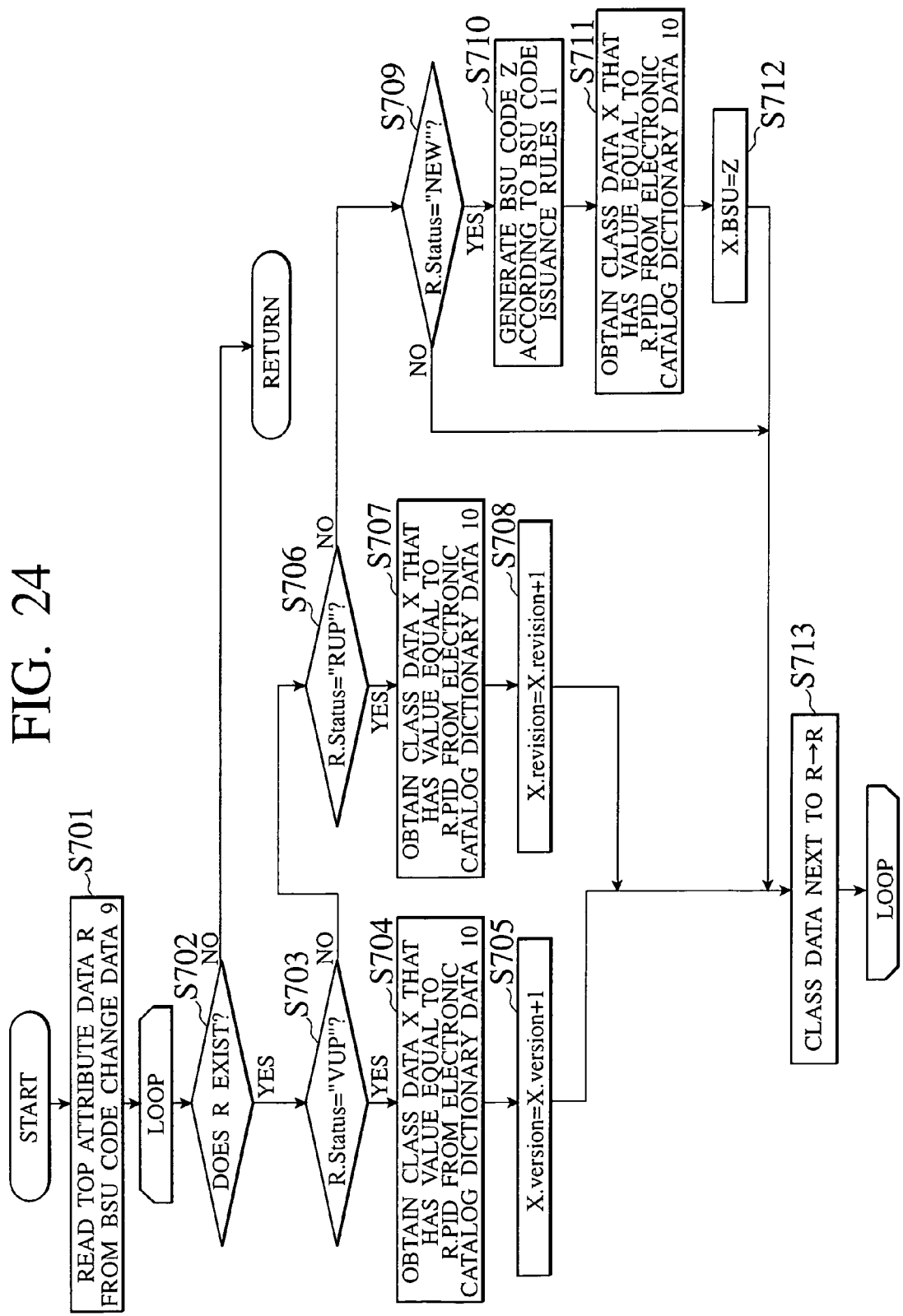
FIG. 24 is a flow chart for a processing by a BSU code update function with respect to attribute data at the step S22 of FIG. 10.

Also, in the case of the processing for updating the attribute data, as shown in FIG. 24, the processing is carried out according to the "Status" value of the BSU code change data 9 read by the step S701.

Namely, when it is judged that "Status" is "VUP" at the step S703, the Version UP is carried out at the steps S704 and S705. On the other hand, when it is judged that "Status" is not "VUP" at the step S703 and it is judged that "Status" is "RUP" at the step S706, the Revision UP is carried out at the steps S707 and S708. Else, when it is judged that "Status" is not "VUP" at the step S703 and it is judged that "Status" is not "RUP" at the step S706, whether "Status" is "NEW" or not is judged (step S709), and if "Status" is "NEW", the steps S710 to S712 are carried out according to the BSU code issuance rules 11 as shown in FIG. 21B, such that the new BSU code is issued and written into the BSU field of the attribute data.

(Processing by the Master Database Management Unit 8)

Figure 25:
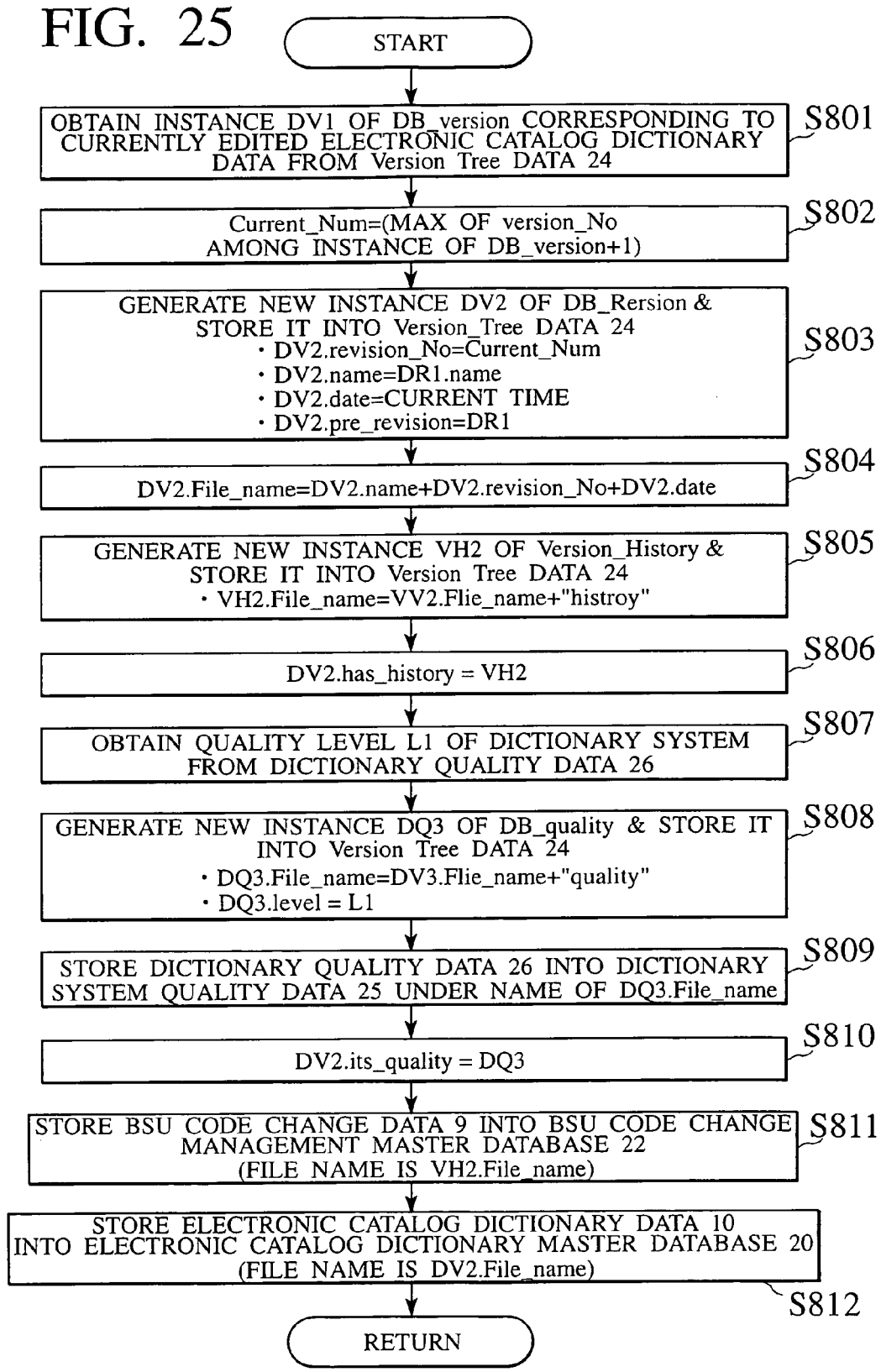
FIG. 25 is a flow chart for a processing by a master database management unit at the step S23 of FIG. 10.

The electronic catalog dictionary data with a high level of completeness are stored into the electronic catalog dictionary master database 20 as the master electronic catalog dictionary data 21. FIG. 25 shows a flow chart for a processing of the master database management unit 8 to store data in the processing of the step S23 of FIG. 10.

As shown in FIG. 25, at the steps S801 to S806, the DB_Version entity and the Version_History entity for describing relationships between the BSU code change data 9 and the electronic catalog dictionary data 10 that are desired to be stored in order to carry out the version management of the dictionary are generated, and stored into the Version Tree data 24.

Next, at the step S807 to S810, the quality information of the dictionary is obtained from the dictionary system quality data 26, and the DB_quality entity is generated and stored in the Version Tree data 24 similarly. Then, at the step S811, the BSU code change data 9 created by the summary generation function 3 are stored into the BSU code change management master database 22 as the master BSU code change data 23. Finally, at the step S812, the electronic catalog dictionary data 10 is stored into the electronic catalog dictionary master database 20 as the master electronic catalog dictionary data 21.

(Electronic Catalog Maintenance Program)

Note that the electronic catalog maintenance system described above can be realized by producing an electronic catalog maintenance program described in a prescribed programming language and installing this maintenance program into a general purpose computer such as PC, for example.

Namely, an electronic catalog maintenance software can be formed by a program for detecting the change status of the electronic catalog dictionary data 10 due to the editing by the dictionary editor 1 or the like and generating the BSU code change data 9 when the change that is out of the standard such as ISO13584 is made, and a program for recording the changed electronic catalog dictionary data 10 and the BSU code change data 9.

Note that in this electronic catalog maintenance software, it is preferable to include a program for generating the summary by simplifying the BSU code change data 9 by deleting the redundant portion from the change history of the BSU code change data 9 as described above.

This electronic catalog maintenance software may also include a program for setting the BSU codes used before the change in retired states when the change status is out of the standard such as ISO13584 and newly issuing corresponding codes to the catalog data or the dictionary data relevant to the out-of-standard change, and a program for generating and storing the BSU code change data 9 that records the correspondence between the retired BSU codes and the newly issued BSU codes.

This electronic catalog maintenance software may also include a program for evaluating the quality of the electronic catalog dictionary system and each element constituting the changed electronic catalog dictionary data 10 according to the quality check rules 13, generating the dictionary system quality data 26, and storing the dictionary system quality data 26 into the BSU code change management editing database 16.

Figure 26:
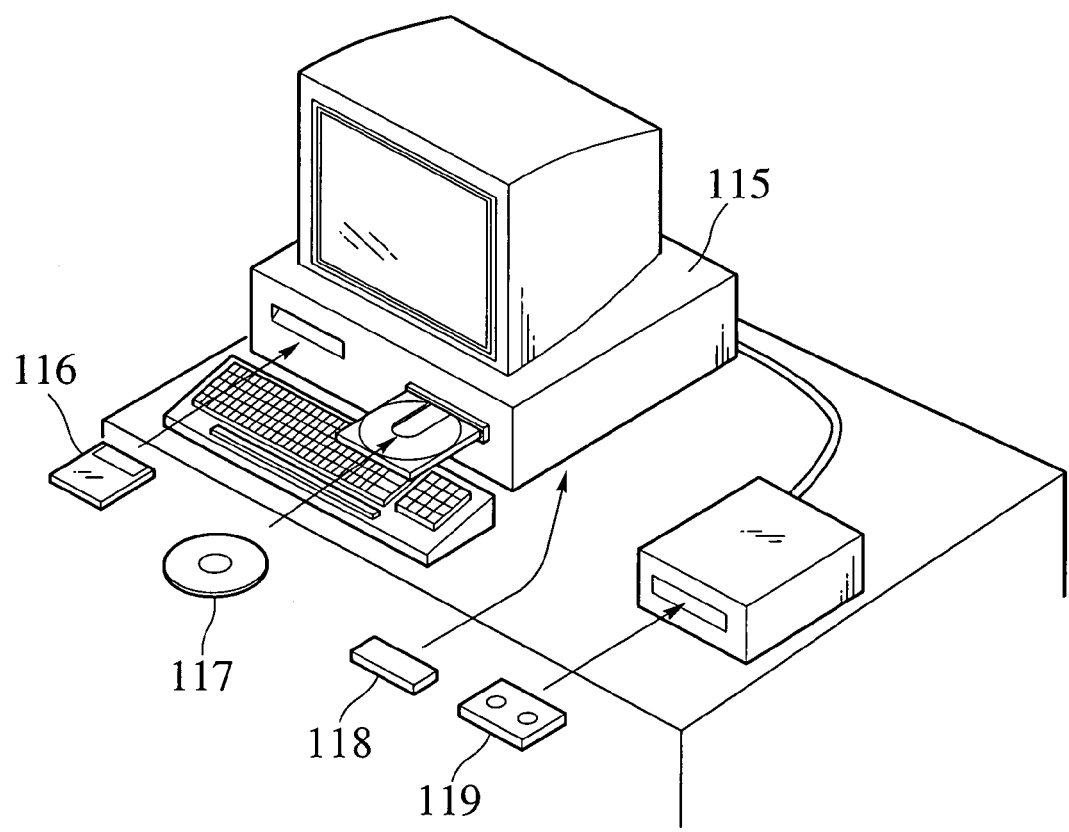
FIG. 26 is a diagram showing computer readable recording media for recording an electronic catalog maintenance program according to the present invention.
Figure 27:
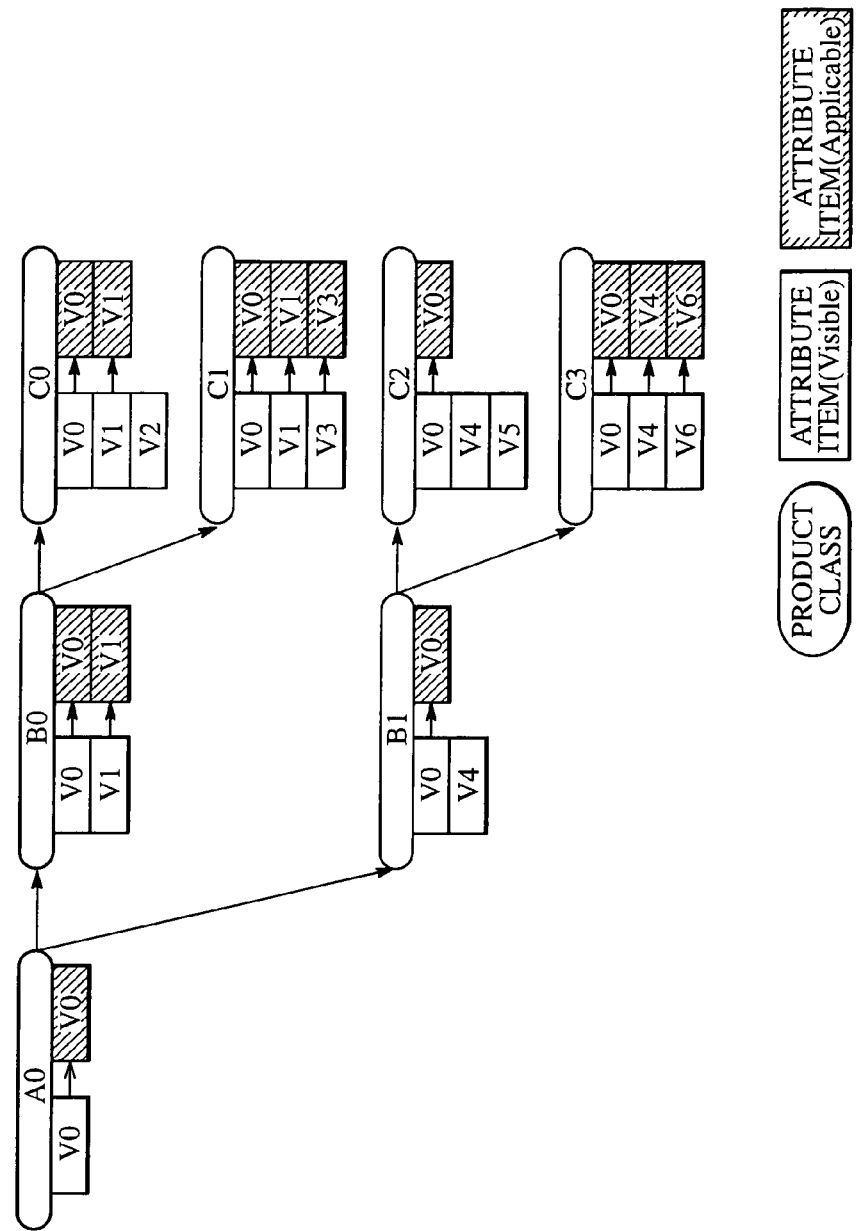
FIG. 27 is a diagram showing an exemplary electronic catalog data structure according to ISO13584.
Figure 31:
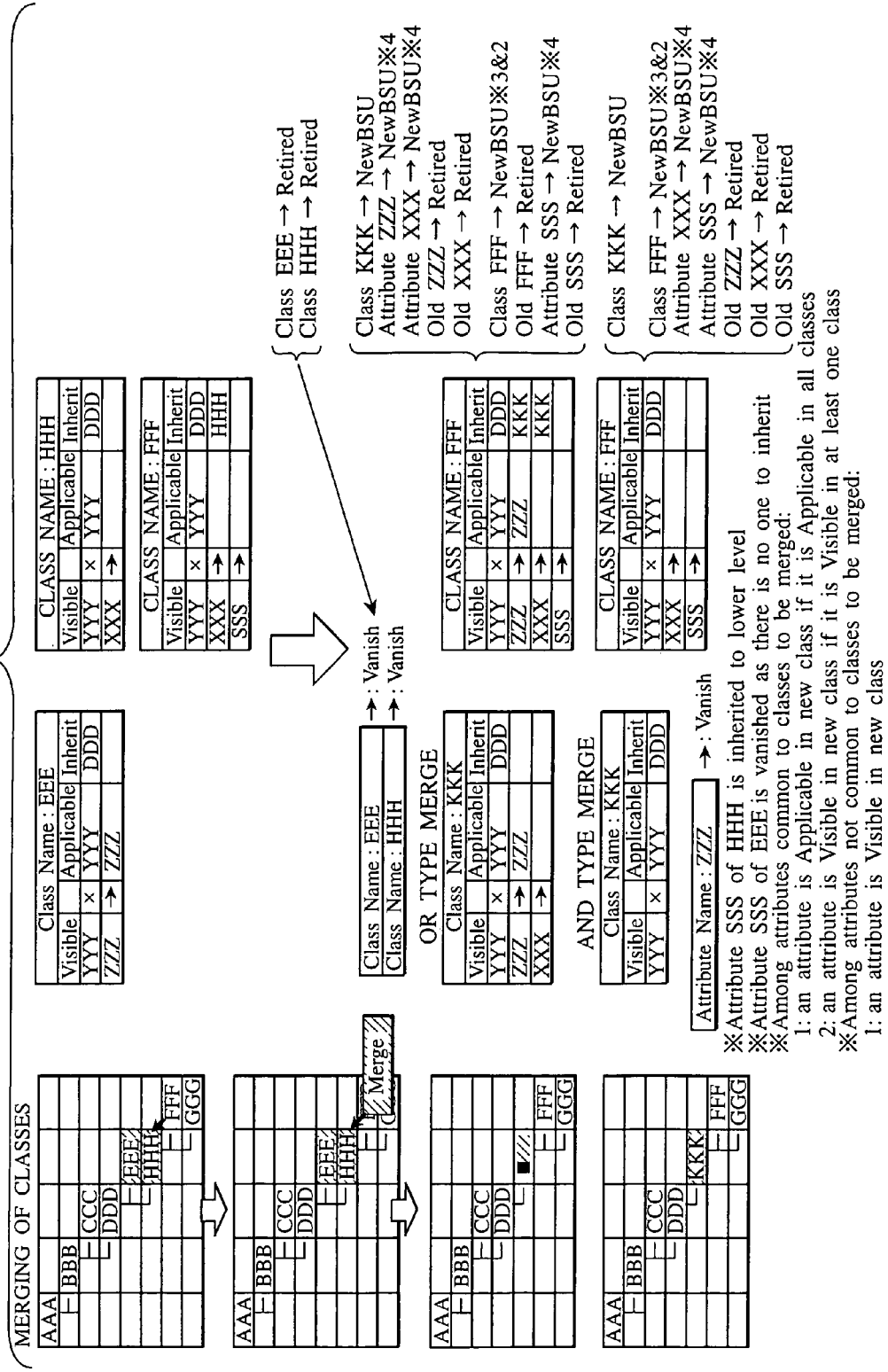
FIG. 31 is a diagram showing an exemplary BSU code change due to an electronic catalog change for merging of classes.
Figure 32:
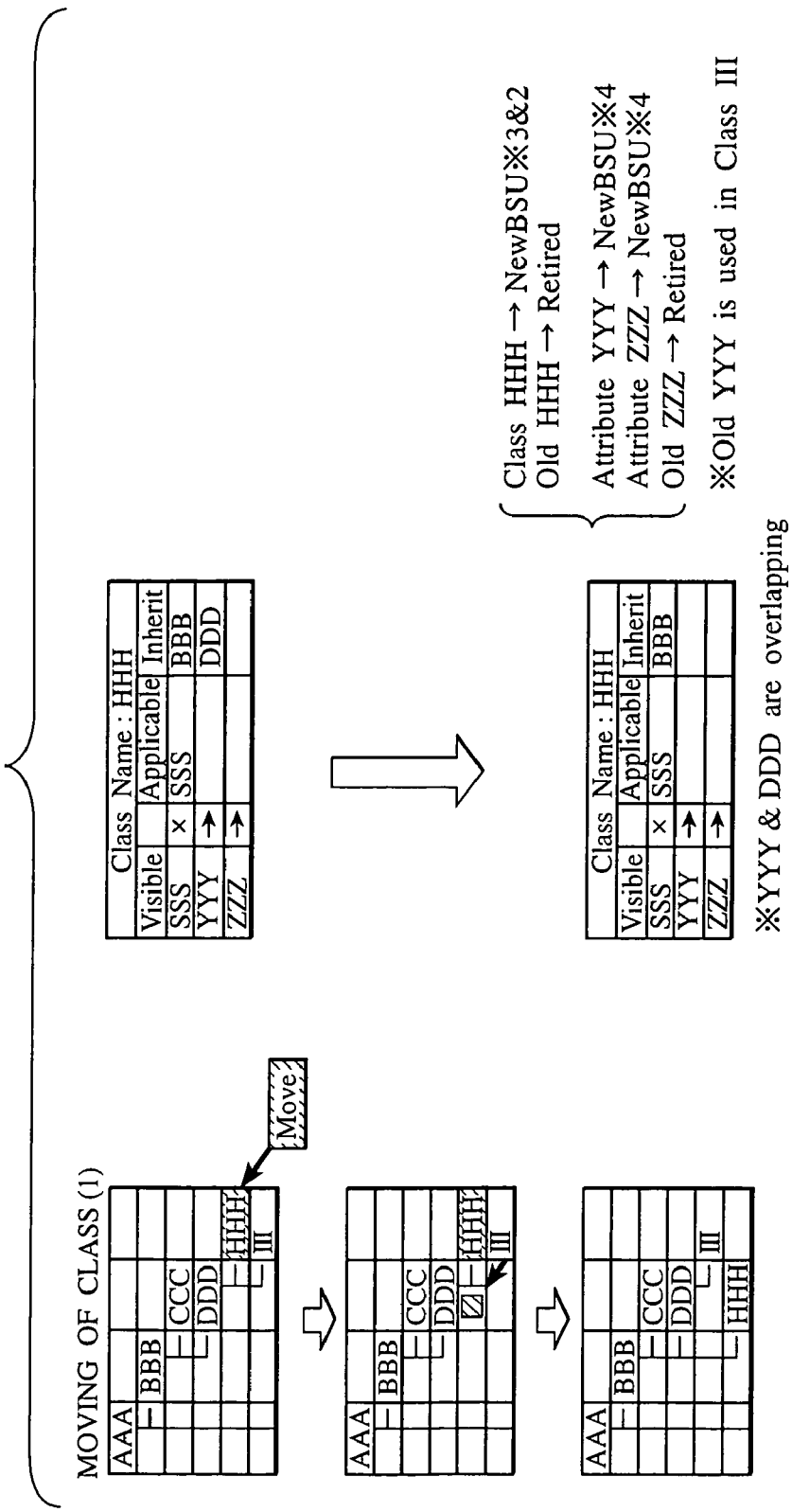
FIG. 32 is a diagram showing an exemplary BSU code change due to an electronic catalog change for moving of a class.
Figure 33:
FIG. 33 is a diagram showing an exemplary BSU code change due to an electronic catalog change for moving of a class.
Figure 34:
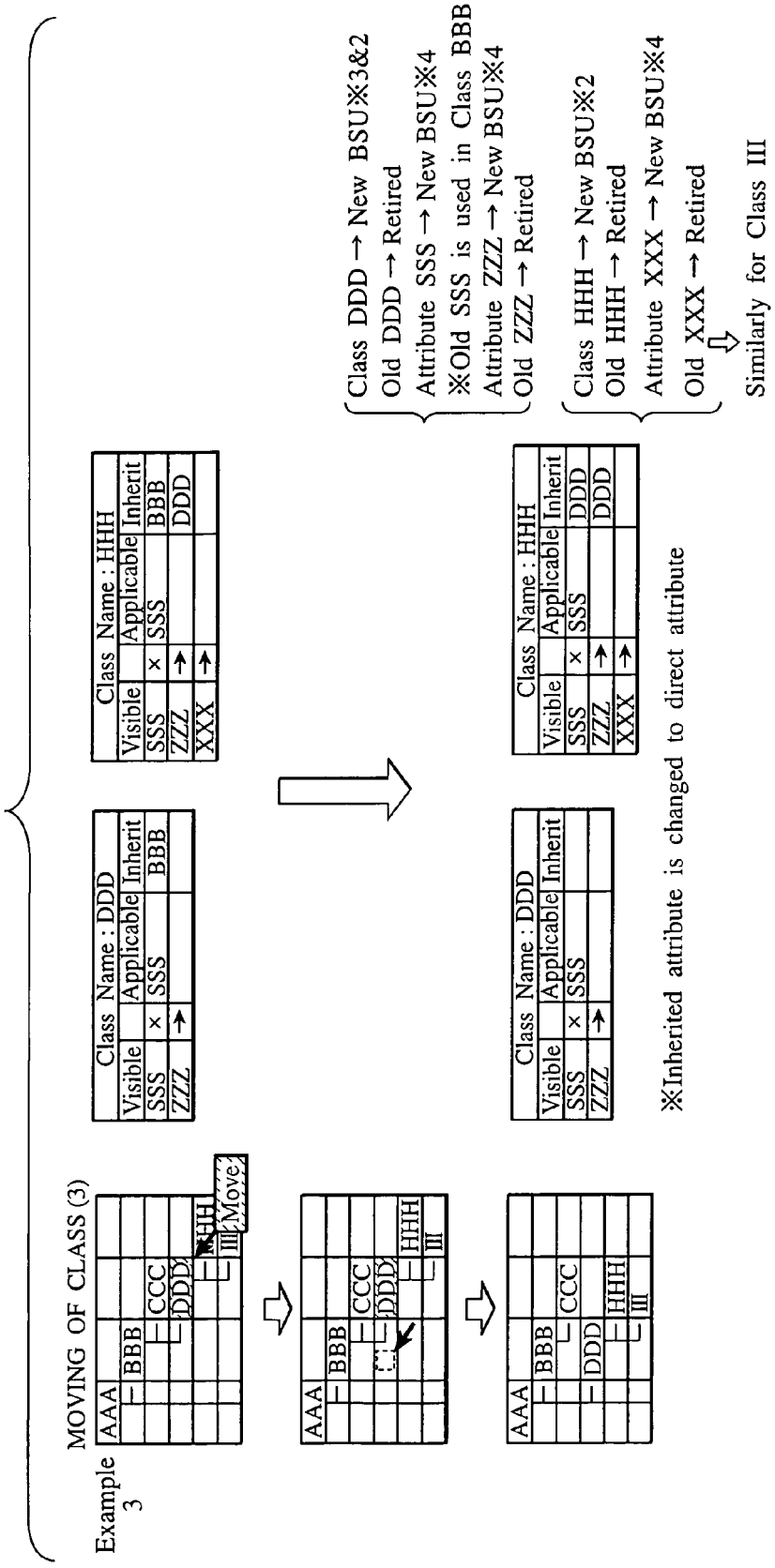
FIG. 34 is a diagram showing an exemplary BSU code change due to an electronic catalog change for moving of a class.
Figure 36:
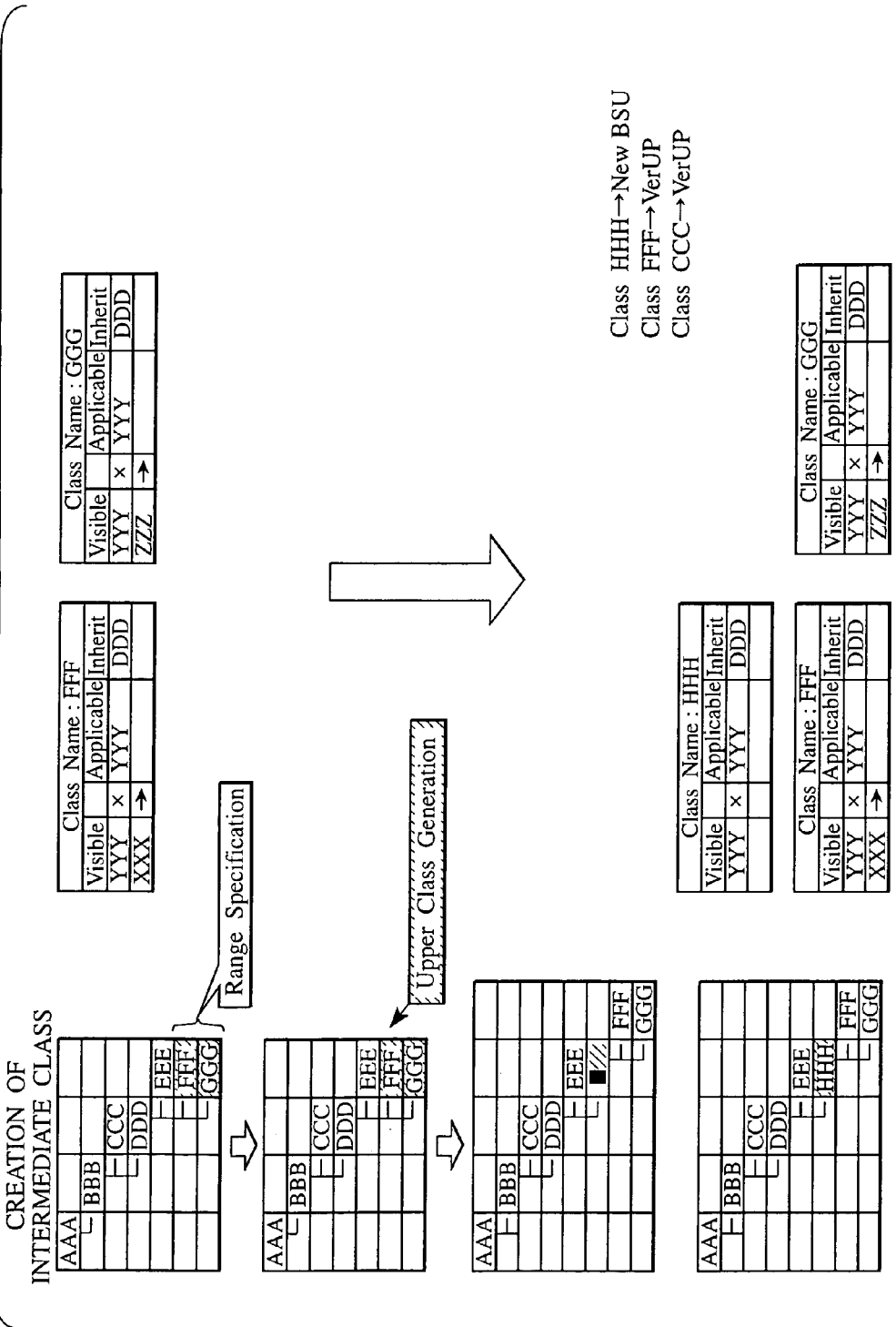
FIG. 36 is a diagram showing an exemplary BSU code change due to an electronic catalog change for creation of an intermediate class.
Figure 37:
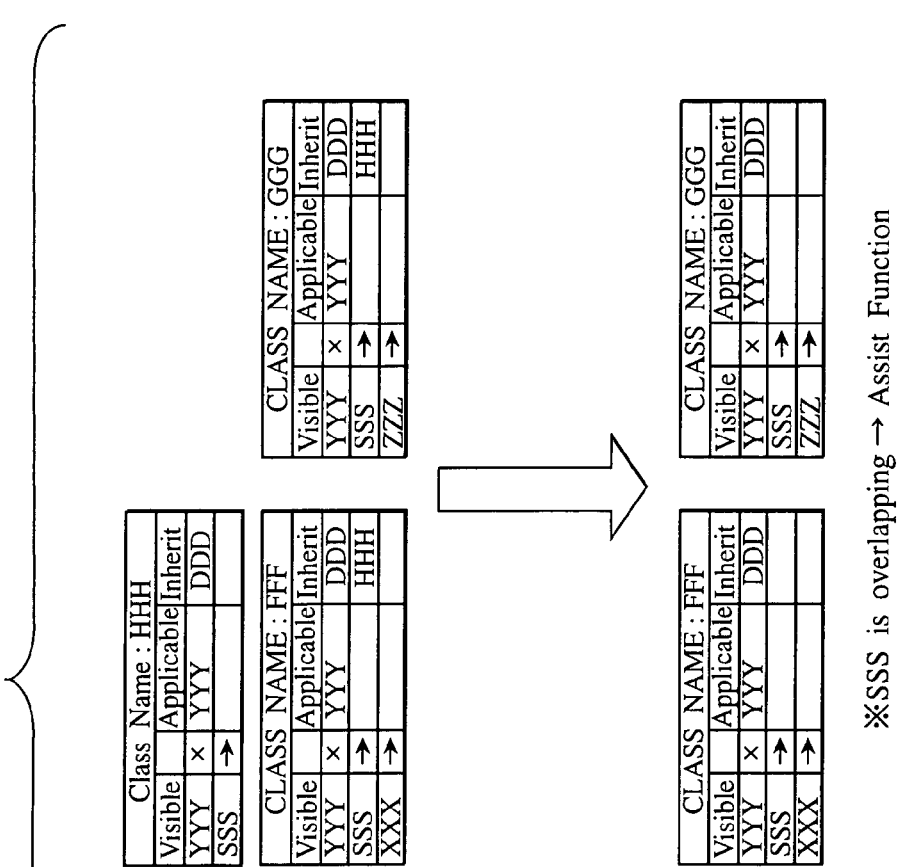
FIG. 37 is a diagram showing an exemplary BSU code change due to an electronic catalog change for deletion of an intermediate class.

The electronic catalog maintenance software so produced can be recorded on recording media 116–119 that are readable by a general purpose computer 115 as shown in FIG. 26. More specifically, as shown in FIG. 26, this electronic catalog maintenance software can be recorded on computer readable recording media such as a magnetic recording medium like a floppy disk 116 or a cassette tape 119, an optical disk like a CD-ROM 117, and a RAM card 118.

Then, by using such computer readable recording media that record this electronic catalog maintenance software, it is possible to easily realize storing, carrying, and installing of a useful program that has an effect of enabling the efficient electronic catalog change management and ensuring generality of the electronic catalog by carrying out the comprehensive version management for the electronic catalog dictionary data relevant to the change operation.

As described, according to the electronic catalog maintenance system of the present invention, it becomes possible to enable the efficient electronic catalog change management and ensure generality of the electronic catalog by carrying out the comprehensive version management for the electronic catalog dictionary data relevant to the change operation such that the electronic catalog can be utilized without requiring a major modification to the existing systems.

Here, the prescribed electronic catalog standard can be any international standard such as ISO13584 (Parts Library) and IEC61360, for example. Also, the product classification information can be given by "product class (class)" or "attribute item (property)", for example. Also, the identifier can be given by BSU code, for example.

Also, the out-of-standard changes include addition or deletion of an intermediate hierarchy, issuance of new identifier, and a change of the tree structure that causes an occurrence of an identifier in a retired state. This change status can be detected according to Version/Revision updates, presence or absence of a new identifier (ID), and presence or absence of an identifier (ID) in a retired state, for example.

Thus, according to the present invention, it is possible to make the electronic catalog change management easier by comparing the electronic catalog before and after the change by utilizing the history information, and it is possible to improve degrees of freedom in the electronic catalog change operations by enabling the out-of-standard changes.

Also, according to the present invention, it is possible to make the change processing management easier by deleting unnecessary change processing (of the case where there is no change eventually or the case where there is only a minor change) such as those occurring in the case of the editing in which the changes are made repeatedly by trial and error, for example, from the history information.

Also, according to the present invention, it is possible to make access to the contents relevant to the out-of-standard change from a newly issued identifier, so that this system can be used in the legacy system and it is possible to ensure usefulness and generality of the electronic catalog.

Also, according to the present invention, it is possible to realize the change status management in accordance with the international standard such as ISO13584 (Parts Library) and IEC61360, for example, so that it is possible to improve generality of the electronic catalog.

Also, according to the present invention, it is possible to distinguish a minor change at a time of the change operation and a formal change at a time of disclosure as a formal version up by selecting the storage unit according to the level of completeness of the electronic catalog, so that it is possible to provide the high quality dictionary.

Also according to the present invention, it is possible to improve the quality of the electronic catalog by evaluating the quality of the electronic catalog dictionary system and each element constituting the changed electronic catalog by using the dictionary system quality check function.

It is also to be noted that, besides those already mentioned above, many modifications and variations of the above embodiments may be made without departing from the novel and advantageous features of the present invention.

Accordingly, all such modifications and variations are intended to be included within the scope of the appended claims.

What is claimed is:

1. An electronic catalog maintenance system, comprising:
a dictionary database configured to store dictionary data of an electronic catalog, the dictionary data being given in a form of a tree structure formed by identifiers for uniquely identifying classes classifying products and attributes of the products;
an editing unit configured to edit the dictionary data stored by the dictionary database by making changes including standard changes defined by a prescribed standard and out-of-standard changes not defined by the prescribed standard;
a change status detection unit configured to detect a status of each change made by the editing unit, and to generate an identifier change data indicating the status of each change made by the editing unit and updates of identifiers to be made in the dictionary data;
an identifier update unit configured to issue a new identifier of each class or attribute created by an out-of standard change made by the editing unit, and to retire an old identifier of each class or attribute deleted by an out-of-standard change made by the editing unit, according to the identifier change data generated by the change status detection unit;
an identifier change database configured to store the identifier change data generated by the change status detection unit;
a summary generation unit configured to simplify the identifier chance data by deleting any redundant portion from the identifier change data generated by the change status detection unit;
wherein the identifier chance database stores the identifier change data as simplified by the summary generation unit; and
a quality check unit configured to generate a dictionary system quality data by evaluating qualities of the dictionary data as a whole and each element constituting the dictionary data, according to prescribed quality check rules, after the dictionary data are edited by the editing unit;
wherein the identifier change database also stores the dictionary system quality data generated by the quality check unit.

2. The system of claim 1, wherein the change status detection unit generates the identifier change data that indicates the updates of identifiers to be made such that both new identifiers and old identifiers can be used in accessing the classes and the attributes after updating by the identifier update unit, by referring to the identifier change data stored in the identifier change database.

3. The system of claim 1, wherein the editing unit makes the standard changes in forms of version/revision updates defined by ISO13584 standard, and the out-of-standard changes not defined by ISO13584.

4. The system of claim 1, wherein the change status detection unit detects the status of each change made by the editing unit according to occurrences of version/revision updates, issuance of the new identifier, and retirement of the old identifier.

5. The system of claim 1, wherein the dictionary database includes:
an editing dictionary database for storing a version of the dictionary data for which editing operations are in progress; and
a master dictionary database for storing a version of the dictionary data for which the editing operations are completed.

6. The system of claim 1, wherein the identifier change database includes:
an editing identifier change database for storing the identifier change data corresponding to a version of the dictionary data for which editing operations are in progress; and
a master identifier change database for storing the identifier change data corresponding to a version of the dictionary data for which the editing operations are completed.

7. An electronic catalog maintenance method, comprising the steps of:
(a) storing dictionary data of an electronic catalog in a dictionary database, the dictionary data being given in a form of a tree structure formed by identifiers for uniquely identifying classes classifying products and attributes of the products;
(b) editing the dictionary data stored by the dictionary database by making changes including standard changes defined by a prescribed standard and out-of-standard changes not defined by the prescribed standard;
(c) detecting a status of each change made by the step (b), and generating an identifier change data indicating the status of each change made by the step (b) and updates of identifiers to be made in the dictionary data;
(d) issuing a new identifier of each class or attribute created by an out-of-standard change made by the step (b), and releasing an old identifier of each class or attribute deleted by an out-of-standard change made by the step (b), according to the identifier change data generated at the step (c);
(e) storing the identifier change data generated by the step (c) in an identifier change database;
(f) simplifying the identifier change data by deleting any redundant portion from the identifier chance data generated by the step (c);
wherein the step (e) stores the identifier change data as simplified by the step (f) into the identifier change database; and
(g) generating a dictionary system quality data by evaluating qualities of the dictionary data as a whole and each element constituting the dictionary data according to prescribed quality check rules, after the dictionary data are edited by the step (b);
wherein the step (e) also stores the dictionary system quality data generated by the step (g) in the identifier change database.

8. The method of claim 7, wherein the step (c) generates the identifier change data that indicates the updates of identifiers to be made such that both new identifiers and old identifiers can be used in accessing the classes and the attributes after updating by the step (d), by referring to the identifier change data stored in the identifier change database.

9. The method of claim 7, wherein the step (b) makes the standard changes in forms of version/revision updates defined by ISO13584 standard, and the out-of-standard changes not defined by ISO13584.

10. The method of claim 7, wherein the step (c) detects the status of each change made by the step (b) according to occurrences of version/revision updates, issuance of the new identifier, and retirement of the old identifier.

11. The method of claim 7, wherein the step (a) stores a version of the dictionary data for which editing operations are in progress, into an editing dictionary database of the dictionary database; and the method further comprises the step of storing a version of the dictionary data for which the editing operations are completed, into a master dictionary database of the dictionary database.

12. The method of claim 7, wherein the step (e) stores the identifier change data corresponding to a version of the dictionary data for which editing operations are in progress, into an editing identifier change database of the identifier change database; and the method further comprises the step of storing the identifier change data corresponding to a version of the dictionary data for which the editing operations are completed, into a master identifier change database of the identifier change database.

13. A computer usable medium having computer readable program codes embodied therein for causing a computer to function as an electronic catalog maintenance system, the computer readable program codes include:

a first computer readable program code for causing said computer to store dictionary data of an electronic catalog in a dictionary database, the dictionary data being given in a form of a tree structure formed by identifiers for uniquely identifying classes classifying products and attributes of the products;

a second computer readable program code for causing said computer to edit the dictionary data stored by the dictionary database by making changes including standard changes defined by a prescribed standard and out-of-standard changes not defined by the prescribed standard;

a third computer readable program code for causing said computer to detect a status of each change made by the editing unit, and to generate an identifier change data indicating the status of each change made by the editing unit and updates of identifiers to be made in the dictionary data;

a fourth computer readable program code for causing said computer to issue a new identifier of each class or attribute created by an out-of-standard change made by the editing unit, and to retire an old identifier of each class or attribute deleted by an out-of-standard change made by the editing unit, according to the identifier change data generated by the third computer readable program code;

a fifth computer readable program code for causing said computer to store the identifier change data generated by the third computer readable program code in an identifier change database;

a sixth computer readable program code for causing said computer to simplify the identifier change data by deleting any redundant portion from the identifier chance data generated by the third computer readable program code;

wherein the fifth computer readable program code stores the identifier chance data as simplified by the sixth computer readable program code in the identifier change database; and a seventh computer readable program code for causing said computer to generate a dictionary system quality data by evaluating qualities of the dictionary data as a whole and each element constituting the dictionary data according to prescribed quality check rules, after the dictionary data are edited by the second computer readable program code;

wherein the fifth computer readable program code also stores the dictionary system quality data generated by the seventh computer readable program code in the identifier chance database.

14. The medium of claim 13, wherein the third computer readable program code generates the identifier change data that indicates the updates of identifiers to be made such that both new identifiers and old identifiers can be used in accessing the classes and the attributes after updating by the fourth computer readable program code, by referring to the identifier change data stored in the identifier change database.

15. The medium of claim 13, wherein the second computer readable program code makes the standard changes in forms of version/revision updates defined by ISO13584 standard, and the out-of-standard changes not defined by ISO13584.

16. The medium of claim 13, wherein the third computer readable program code detects the status of each change made by the second computer readable program code according to occurrences of version/revision updates, issuance of the new identifier, and retirement of the old identifier.

17. The medium of claim 13, wherein the first computer readable program code stores a version of the dictionary data for which editing operations are in progress, into an editing dictionary database of the dictionary database; and the computer readable program codes further includes an eighth computer readable program code for causing said computer to store a version of the dictionary data for which the editing operations are completed, into a master dictionary database of the dictionary database.

18. The medium of claim 13, wherein the first computer readable program code stores the identifier change data corresponding to a version of the dictionary data for which editing operations are in progress, into an editing identifier change database of the identifier change database; and the computer readable program codes further includes an eighth computer readable program code for causing said computer to store the identifier change data corresponding to a version of the dictionary data for which the editing operations are completed, into a master identifier change database of the identifier change database.

* * * * *